US012435493B2

(12) United States Patent
Horii

(10) Patent No.: US 12,435,493 B2
(45) Date of Patent: Oct. 7, 2025

(54) WORKING MACHINE

(71) Applicant: KUBOTA CORPORATION, Osaka (JP)

(72) Inventor: Hiroshi Horii, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 733 days.

(21) Appl. No.: 17/840,235

(22) Filed: Jun. 14, 2022

(65) Prior Publication Data

US 2023/0021137 A1 Jan. 19, 2023

Related U.S. Application Data

(63) Continuation of application No. PCT/JP2020/048557, filed on Dec. 24, 2020.

(30) Foreign Application Priority Data

Dec. 27, 2019 (JP) ................................ 2019-238285
Dec. 27, 2019 (JP) ................................ 2019-238286
Dec. 27, 2019 (JP) ................................ 2019-238290

(51) Int. Cl.
*E02F 9/22* (2006.01)
*E02F 9/12* (2006.01)
(Continued)

(52) U.S. Cl.
CPC ............ *E02F 9/2296* (2013.01); *E02F 9/123* (2013.01); *E02F 9/2203* (2013.01);
(Continued)

(58) Field of Classification Search
CPC ....... F15B 11/04; F15B 11/042; F15B 11/163; F15B 2211/30555; E02F 9/2203; E02F 9/2225; E02F 9/2228; E02F 9/226
See application file for complete search history.

(56) References Cited

U.S. PATENT DOCUMENTS 5,937,645 A * 8/1999 Hamamoto ......... F15B 13/0417
60/426
8,701,399 B2 * 4/2014 Horii ..................... E02F 9/2296
60/486

(Continued)

FOREIGN PATENT DOCUMENTS

GB 2 359 592 A 8/2001
JP 5-302603 11/1993

(Continued)

OTHER PUBLICATIONS

International Search Report and Written Opinion of the International Searching Authority issued in International Application No. PCT/JP2020/048557, dated Mar. 2, 2021.

(Continued)

*Primary Examiner* — Michael Leslie
(74) *Attorney, Agent, or Firm* — GREENBLUM & BERNSTEIN, P.L.C.

(57) ABSTRACT

A working machine includes: a plurality of hydraulic actuators including a high-load hydraulic actuator and a low-load hydraulic actuator whose hydraulic pressure for actuation thereof is lower than that of the high-load hydraulic actuator; a plurality of direction switching valves each of which switches a direction of a hydraulic fluid for a corresponding one of the hydraulic actuators, the plurality of direction switching valves including a low-load direction switching valve that switches a direction of hydraulic fluid for the low-load hydraulic actuator; and a dummy-load forming unit that forms a dummy load in the low-load direction switching valve to suppress a variation in an actuation speed of the low-load hydraulic actuator between a time when the high-load hydraulic actuator and the low-load hydraulic actuator are operated in combination and a time when the low-load hydraulic actuator is operated singly.

6 Claims, 14 Drawing Sheets

(51) Int. Cl.
*F15B 11/042* (2006.01)
*F15B 11/16* (2006.01)

(52) U.S. Cl.
CPC .......... *E02F 9/2225* (2013.01); *E02F 9/2228* (2013.01); *F15B 11/042* (2013.01); *F15B 11/163* (2013.01); *E02F 9/121* (2013.01); *F15B 2211/20553* (2013.01); *F15B 2211/30555* (2013.01); *F15B 2211/3111* (2013.01); *F15B 2211/351* (2013.01); *F15B 2211/40507* (2013.01); *F15B 2211/7053* (2013.01); *F15B 2211/7058* (2013.01); *F15B 2211/7135* (2013.01); *F15B 2211/7142* (2013.01); *F15B 2211/75* (2013.01); *F15B 2211/781* (2013.01)

(56) References Cited

U.S. PATENT DOCUMENTS

| | | | | |
|---|---|---|---|---|
| 9,377,034 | B2 * | 6/2016 | Horii | F15B 11/163 |
| 9,803,333 | B2 * | 10/2017 | Horii | F15B 11/028 |
| 10,539,162 | B2 * | 1/2020 | Horii | E02F 9/2225 |
| 10,889,963 | B2 * | 1/2021 | Horii | E02F 9/2004 |
| 11,073,171 | B2 * | 7/2021 | Kondo | F15B 11/042 |
| 11,608,616 | B2 * | 3/2023 | Fukuda | F15B 11/166 |
| 11,815,107 | B2 * | 11/2023 | Niwa | F15B 11/163 |
| 2012/0067443 | A1 | 3/2012 | Horii | |
| 2014/0208734 | A1 | 7/2014 | Horii | |
| 2017/0184134 | A1 | 6/2017 | Horii | |

FOREIGN PATENT DOCUMENTS

| | | |
|---|---|---|
| JP | 11-117906 | 4/1999 |
| JP | 2002-31103 | 1/2002 |
| JP | 2012067459 | 4/2012 |
| JP | 2016-008624 A | 1/2016 |
| JP | 2017115992 | 6/2017 |
| JP | 2018-135926 | 8/2018 |

OTHER PUBLICATIONS

Supplementary European Search Report issued Dec. 12, 2023 in corresponding European family member application No. 20906822.0.

Notification of Reasons for Rejection 2022 in connection with the corresponding Japanese Patent Application No. 2019-238285 dated Nov. 11, along with English translation thereof.

* cited by examiner

Fig.9

| | Hard | Normal | Soft |
|---|---|---|---|
| P_C | 27.4 MPa | 24.5 MPa | 15.0 MPa |
| P_B | 24.5 MPa | 20.6 MPa | |
| P_A | 15.0 MPa | 15.0 MPa | |
| t1 | 0.5 sec | 1 sec | (1 sec) |

Fig.12

<table>
<tr><th></th><th>Hard</th><th>Normal</th><th>Soft</th></tr>
<tr><td>P_C</td><td rowspan="2">27.4 MPa</td><td>24.5 MPa</td><td rowspan="2">24.5 MPa</td></tr>
<tr><td>P_B</td><td>20.6 MPa</td></tr>
<tr><td>P_A</td><td>15.0 MPa</td><td>15.0 MPa</td><td>15.0 MPa</td></tr>
<tr><td>t1</td><td>0.5 sec</td><td>0.5 sec</td><td>0.5 sec</td></tr>
</table>

WORKING MACHINE

CROSS REFERENCE TO RELATED APPLICATIONS

This application is a continuation application of International Application No. PCT/JP2020/048557, filed on Dec. 24, 2020, which claims the benefit of priority to Japanese Patent Application No. 2019-238290, filed on Dec. 27, 2019, to Japanese Patent Application No. 2019-238285, filed on Dec. 27, 2019, and to Japanese Patent Application No. 2019-238286, filed on Dec. 27, 2019. The entire contents of each of these applications are hereby incorporated herein by reference.

BACKGROUND OF THE INVENTION

1. Field of the Invention

The present invention relates to a working machine.

2. Description of the Related Art

To date, working machines disclosed in Japanese Unexamined Patent Application Publication No. 2017-115992 and Japanese Unexamined Patent Application Publication No. 2012-67459 are known.

The working machine disclosed in Japanese Unexamined Patent Application Publication No. 2017-115992 includes a plurality of hydraulic actuators and a plurality of direction switching valves corresponding to the plurality of hydraulic actuators. Each of the direction switching valves switches the direction of a hydraulic fluid for a corresponding one of the hydraulic actuators.

The working machine disclosed in Japanese Unexamined Patent Application Publication No. 2012-67459 includes a hydraulic actuator that is actuated in accordance with an operation amount of an operation member, a pump that delivers a hydraulic fluid for actuating the hydraulic actuator, and a relief valve that regulates the pressure of a hydraulic fluid delivered from the pump.

The working machine disclosed in Japanese Unexamined Patent Application Publication No. 2012-67459 includes a machine body on which a working tool is installed and that is capable of swiveling around a vertical axis. A plurality of hydraulic actuators are provided in the working machine, and the hydraulic actuators are respectively controlled by control valves. Each of the control valves includes a pressure compensation valve that functions to adjust loads on the hydraulic actuators when more than one of the control valves are used.

SUMMARY OF THE INVENTION

In the working machine disclosed in Japanese Unexamined Patent Application Publication No. 2017-115992, the actuation speed of a low-load hydraulic actuator, whose hydraulic pressure required for actuation thereof is lower than that of a high-load hydraulic actuator, may vary between a time when the high-load hydraulic actuator and the low-load hydraulic actuator are operated in combination and a time when the low-load hydraulic actuator is operated singly.

Japanese Unexamined Patent Application Publication No. 2012-67459 discloses a relief valve whose relief set pressure, which is a regulated pressure, is constant. Therefore, the working machine has a problem in that the activation shock of a hydraulic actuator is large when an operation member is sharply operated.

Moreover, in the working machine disclosed in PTL 2, when the machine body is swiveled while a working-tool driving actuator, which is a hydraulic actuator for driving a working tool, is relieved, the working-tool driving actuator is moved by a relief pressure and a swivel motor, which is a hydraulic actuator for swiveling the machine body, is actuated by a low pressure. Then, in order to appropriately distribute the flow of a hydraulic fluid, a control system generates a dummy load by using a pressure compensation valve of a swivel control valve for controlling the swivel motor to balance the loads on the hydraulic actuators. Then, the fluid temperature of a hydraulic fluid that flows to a section on the swivel side increases, and components of the swivel motor may deteriorate.

In consideration of the above problem, an object of the present invention is to suppress a variation in the actuation speed of a low-load hydraulic actuator whose hydraulic pressure required for actuation thereof is low.

Another object of the present invention is to provide a working machine that can suppress an activation shock of a hydraulic actuator.

Another object of the present invention is to provide a working machine that can suppress an increase in the temperature of a hydraulic fluid that flows to the swivel side.

A working machine according to an aspect of the present invention includes: a plurality of hydraulic actuators including a high-load hydraulic actuator and a low-load hydraulic actuator, a hydraulic pressure required for actuation of the low-load hydraulic actuator being lower than a hydraulic pressure required for actuation of the high-load hydraulic actuator; a plurality of direction switching valves that are provided so as to correspond to the plurality of hydraulic actuators, respectively, and each of which switches a direction of hydraulic fluid for a corresponding one of the hydraulic actuators, the plurality of direction switching valves including a low-load direction switching valve that switches a direction of hydraulic fluid for the low-load hydraulic actuator; and a dummy-load forming unit that forms a dummy load in the low-load direction switching valve to suppress a variation in an actuation speed of the low-load hydraulic actuator between a time when the high-load hydraulic actuator and the low-load hydraulic actuator are operated in combination and a time when the low-load hydraulic actuator is operated singly.

The low-load direction switching valve may have a flow passage through which a hydraulic fluid flows toward the low-load hydraulic actuator, and the dummy-load forming unit may include a throttle that is provided in the flow passage.

The working machine may include: a first control valve that controls the high-load hydraulic actuator and that includes a pressure compensation valve that sets a pressure difference between a pressure of a hydraulic fluid that is introduced thereinto and a pressure of a hydraulic fluid output therefrom to be constant; and a second control valve that controls the low-load hydraulic actuator and that includes the low-load direction switching valve and a flow-rate prioritizing valve that prioritizes a flow rate of a hydraulic fluid output to the low-load hydraulic actuator via the low-load direction switching valve.

The flow-rate prioritizing valve may include: a spool that is movable between a first position in which the spool increases a flow rate of a hydraulic fluid output from the low-load direction switching valve and a second position in which the spool reduces the flow rate of the hydraulic fluid output from the low-load direction switching valve; and a pressing member that presses the spool toward the first position. The low-load direction switching valve may include a first flow passage that is the flow passage through which a hydraulic fluid flows to one side of the low-load hydraulic actuator, and a second flow passage that is the flow passage through which a hydraulic fluid flows to the other side of the low-load hydraulic actuator. The dummy-load forming unit may include a first throttle that is the throttle provided in the first flow passage and a second throttle that is the throttle provided in the second flow passage.

The low-load direction switching valve may include a pump port to which a hydraulic fluid is supplied, a delivery port from which a hydraulic fluid is output to the flow-rate prioritizing valve, a connection fluid passage that connects the pump port and the delivery port, and a flow passage throttle that is provided in the connection fluid passage. A pressure loss due to the first throttle and a pressure loss due to the second throttle may be larger than a pressure loss due to the flow passage throttle.

The working machine may include a machine body that is capable of swiveling around a vertical axis, a swivel motor that swivels the machine body, a boom that is provided on a front part of the machine body so as to be swingable upward and downward, and a boom cylinder that swings the boom upward and downward. The high-load hydraulic actuator may include the boom cylinder. The low-load hydraulic actuator may include the swivel motor.

The working machine may include a variable displacement pump that delivers a hydraulic fluid for actuating the plurality of hydraulic actuators, and a load sensing system that controls the pump so that a pressure difference between a delivery pressure of the pump and a highest load pressure of the plurality of hydraulic actuators is a constant pressure.

A working machine according to another aspect of the present invention includes: an operation member, a hydraulic actuator that is actuated in accordance with an operation amount of the operation member; a pump that delivers a hydraulic fluid for actuating the hydraulic actuator; a variable relief valve that variably regulates the pressure of a hydraulic fluid delivered from the pump; and a relief controller that controls a relief set pressure that is a pressure regulated by the variable relief valve. The relief controller changes the relief set pressure in accordance with the operation amount of the operation member.

The relief controller may set the relief set pressure to one of a plurality of set values, and increases the set value of the relief set pressure in a stepwise manner in accordance with an increase of the operation amount of the operation member.

The relief controller may regulate the relief set pressure to a first set value when the operation member is not operated, changes the relief set pressure to a second set value higher than the first set value at a predetermined time after the operation member is operated, and changes the relief set pressure to a third set value higher than the second set value when the operation amount of the operation member exceeds a predetermined amount.

The relief controller may change the relief set pressure to the third set value when the operation amount of the operation member exceeds a predetermined amount within a predetermined time after the operation member is operated.

The working machine may have a plurality of modes having different set values of the relief set pressure, and the plurality of modes may differ from each other in the set values of the highest pressure of the relief set pressure.

The plurality of modes may include a first mode whose set value of the highest pressure of the relief set pressure is the highest, a second mode whose set value of the highest pressure of the relief set pressure is lower than that of the first mode, and a third mode whose set value of the highest pressure of the relief set pressure is lower than that of the second mode. The relief set pressures of the first mode, the second mode, and the third mode when the operation member is not operated may be the same set value.

The working machine may include: a fluid temperature sensor that detects the fluid temperature of a hydraulic fluid; and an automatic switcher that switches the mode to one of the plurality of modes whose set value of the highest pressure of the relief set pressure is the highest when the fluid temperature is lower than a first predetermined temperature and that returns the mode to the original mode when the fluid temperature becomes a second predetermined temperature higher than the first predetermined temperature.

The working machine may include a plurality of the hydraulic actuators, the pump is a variable displacement pump, and the working machine includes a load sensing system that controls the pump so that the pressure difference between the delivery pressure of the pump and the highest load pressure of the plurality of hydraulic actuators is a constant pressure.

A working machine according to still another aspect of the present invention includes a machine body, a swivel motor that swivels the machine body, a working tool installed on the machine body, a working-tool driving actuator that drives the working tool, a hydraulic circuit that supplies a hydraulic fluid to and discharges the hydraulic fluid from the swivel motor and the working tool actuator, a main relief valve that relieves the hydraulic fluid when the pressure of a hydraulic fluid in the hydraulic circuit becomes higher than or equal to a set pressure, a variable overload relief valve that relieves a hydraulic fluid in the working-tool driving actuator when the pressure of the hydraulic fluid becomes higher than or equal to a predetermined pressure, and an overload controller that controls the variable overload relief valve. The overload controller reduces the relief set pressure of the variable overload relief valve when the machine body swivels in a relief state in which the main relief valve is relieved.

The working machine may include an operation detector that detects a motion of an operation member that operates the working tool, and a working-tool motion detector that detects a motion of the working tool. When the working tool is operated by using the operation member and the machine body swivels in a state in which the working tool is not moving, the overload controller may reduce the relief set pressure of the variable overload relief valve. Even when the machine body swivels, when the working tool is not operated by using the operation member and when the working tool is moving, the overload controller may not reduce the relief set pressure of the variable overload relief valve.

The working machine may include an actuator control valve that controls the working-tool driving actuator, and a stroke limiter that limits the stroke of the spool of the actuator control valve to a predetermined amount when the overload controller reduces the relief set pressure of the variable overload relief valve.

The actuator control valve may be operated by a pilot pressure, and, when a pilot pressure applied to the actuator control valve is higher than a threshold, the stroke limiter may limit the stroke by reducing the pilot pressure to the threshold.

The working machine may include: a plurality of hydraulic actuators including a swivel motor that swivels the machine body and the working-tool driving actuator; a hydraulic fluid pump that delivers a hydraulic fluid supplied to the plurality of hydraulic actuators; and a load sensing system that controls the pump so that the pressure difference between the delivery pressure of the pump and the highest load pressure of the plurality of hydraulic actuators becomes a constant pressure.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 9 is a table showing settings of a main relief pressure in each mode.

FIG. 12 is another table showing settings of the main relief pressure in each mode.

DETAILED DESCRIPTION OF THE PREFERRED EMBODIMENTS

Figure 1:
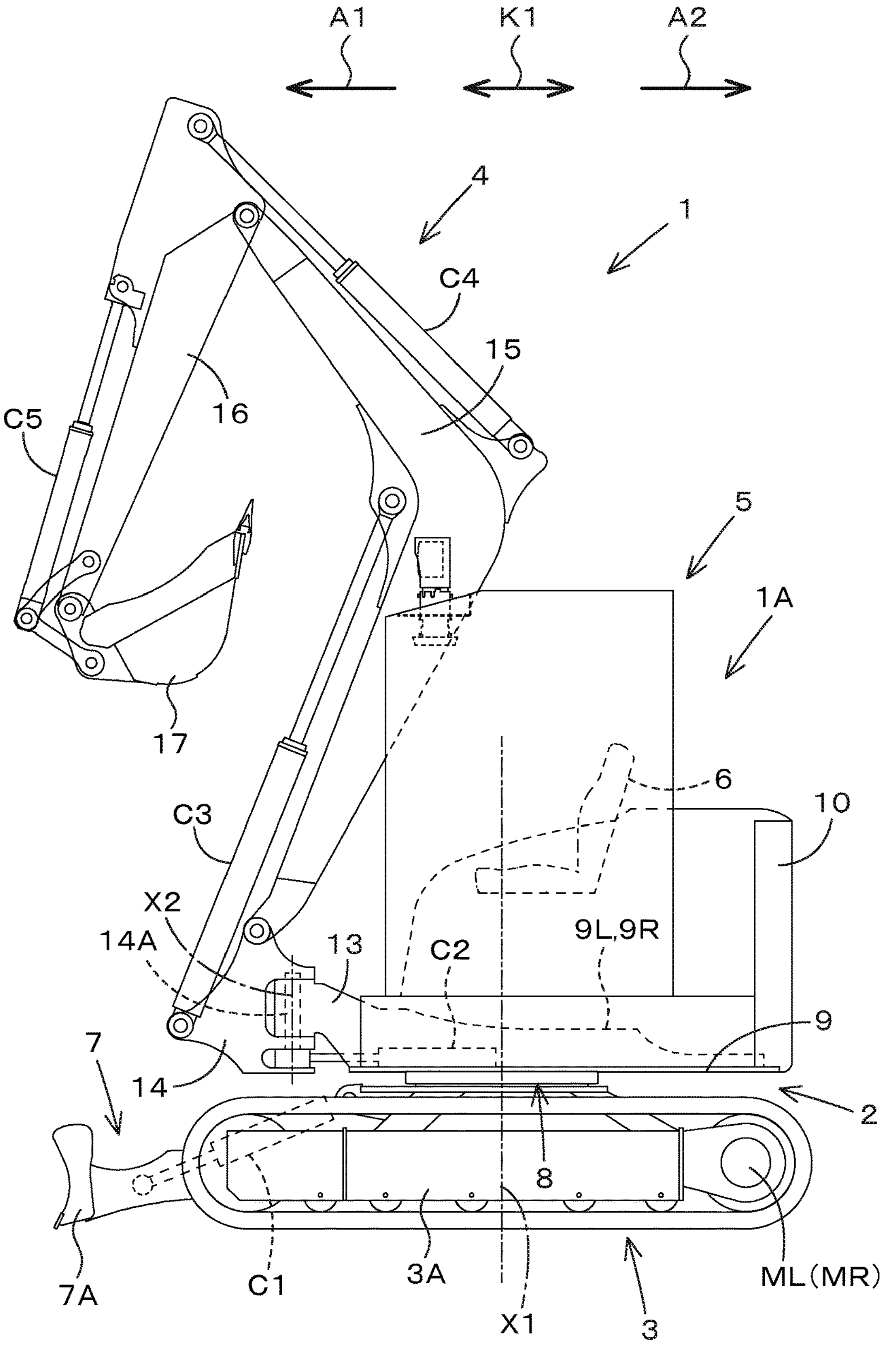
FIG. 1 is a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereafter, an embodiment of the present invention will be described with reference to the drawings.

Figure 2:
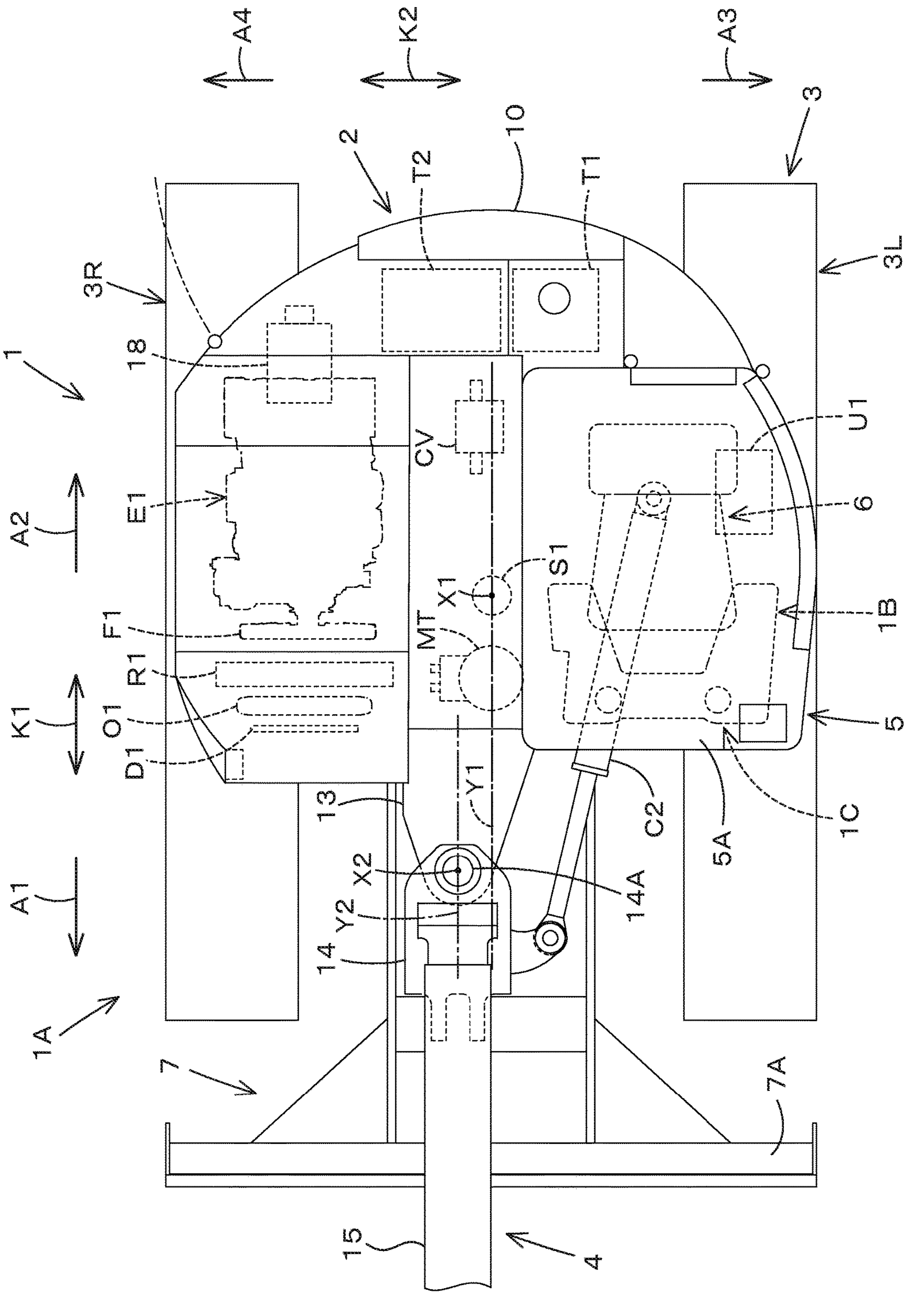
FIG. 2 is a plan view of the working machine.

FIG. 1 is a schematic side view illustrating the overall structure of a working machine 1 according to the present embodiment. FIG. 2 is a schematic plan view of the working machine 1. In the present embodiment, a backhoe, which is a swivel working machine, is described as an example of the working machine 1. The working machine is not limited to a backhoe, and may be a tractor, a wheel loader, a combine, or the like.

As illustrated in FIGS. 1 and 2, the working machine 1 includes a traveling body 1A, and a working device 4 installed on the traveling body 1A. The traveling body 1A includes a traveling device 3, a machine body (swivel base) 2 mounted on the traveling device 3, and a cabin 5 mounted on the machine body 2.

An operator's seat 6, on which an operator sits, is provided inside the cabin 5. The operator's seat 6 is mounted on the machine body 2, and the cabin 5 surrounds the operator's seat 6. That is, the cabin 5 is an operator's seat protector. The operator's seat protector may be a canopy.

In the present embodiment, a forward direction corresponds a forward direction of an operator sitting on the operator's seat 6 of the working machine 1 (the direction of an arrow A1 in FIGS. 1 and 2), a backward direction corresponds to a backward direction of the operator (the direction of an arrow A2 in FIGS. 1 and 2), a leftward direction corresponds to a leftward direction of the operator (the direction of an arrow A3 in FIG. 1), and a rightward direction corresponds to a rightward direction of the operator (the direction of an arrow A4 in FIG. 1).

As illustrated in FIG. 1, a machine-body-width direction K2 (the width direction of the machine body 2) corresponds to a horizontal direction perpendicular to a front-back direction KL. A machine-body-outward direction (outward in the machine-body-width direction K2) corresponds to a rightward direction or a leftward direction from a central part of the machine body 2 in the width direction. That is, the machine-body-outward direction is a direction away from the center of the machine body 2 in the machine-body-width direction K2. A machine-body-inward direction (inward in the machine-body-width direction K2) corresponds to a direction opposite to the machine-body-outward direction. That is, the machine-body-inward direction is a direction toward the center of the machine body 2 in the machine-body-width direction.

As illustrated in FIGS. 1 and 2, the traveling device 3 supports the machine body 2 so that the machine body 2 is capable of traveling. The traveling device 3 includes a traveling frame 3A, a first traveling device 3L provided on the left side of the traveling frame 3A, and a second traveling device 3R provided on the right side of the traveling frame 3A. The first traveling device 3L and the second traveling device 3R are each a crawler-type traveling device. The first traveling device 3L is driven by a first traveling motor ML. The second traveling device 3R is driven by a second traveling motor MR. The first traveling motor ML and the second traveling motor MR each include a hydraulic motor (hydraulic actuator).

A dozer 7 is attached to a front part of the traveling device 3. The dozer 7 is driven by a dozer cylinder C1. To be specific, the dozer cylinder C1 includes a hydraulic cylinder (hydraulic actuator), and a blade 7A of the dozer 7 is raised or lowered when the dozer cylinder C1 extends and contracts.

As illustrated in FIG. 1, the machine body 2 is supported on the traveling frame 3A via a swivel bearing 8 so that the machine body 2 is capable of swiveling around a swivel axis (vertical axis) X1. The swivel axis X1 extends in the up-down direction through the center of the swivel bearing 8.

As illustrated in FIG. 2, the cabin 5 is mounted on one side part (left side part) of the machine body 2 in the width direction K2. The cabin 5 is disposed on one side (the left side), in the machine-body-width direction K2, of a center line Y1 that passes through the swivel axis X1 and that extends in the front-back direction K1. The cabin 5 is provided near a front part of the machine body 2.

As illustrated in FIG. 2, a prime mover E1 is mounted in the other side part (right side part) of the machine body 2 in the width direction K2. The prime mover E1 is longitudinally mounted in the machine body 2. The phrase "longitudinally mounted" means that the prime mover E1 is disposed so that the axis of a crankshaft thereof extends in the front-back direction.

The prime mover E1 is disposed on the other side (the right side) of the center line Y1 in the machine-body-width direction K2. The prime mover E1 is a diesel engine. The prime mover E1 may be a gasoline engine, an electric motor, or a hybrid prime mover including an engine and an electric motor.

A hydraulic-fluid-supplying unit 18 is provided on a back part of the prime mover E1. The hydraulic-fluid-supplying unit 18 is driven by the power of the prime mover E1 to compress and deliver a hydraulic fluid that is to be used in a hydraulic drive unit. The hydraulic drive unit is, for example, a hydraulic actuator or the like installed in the working machine 1. A radiator R1, an oil cooler O1, and a condenser D1 are disposed in front of the prime mover E1, and are installed in the machine body 2. The radiator R1 is a cooling device (first cooling device) that cools cooling water (fluid) of the prime mover E1, and the oil cooler O1 is a cooling device (second cooling device) for cooling a hydraulic fluid. The condenser D1 is a cooling device for cooling a coolant (fluid) for an air conditioner installed in the working machine 1.

A cooling fan F1, for generating cooling airflow for cooling the prime mover E1, is provided between the radiator R1 and the prime mover E1. The cooling fan F1 is driven by the power of the prime mover E1 and generates cooling airflow from the front toward the back of the prime mover E1.

As illustrated in FIG. 2, the machine body 2 includes a base plate (hereafter, referred to as a "swivel base plate) 9 that swivels around the swivel axis X1. The swivel base plate 9 is made of steel or the like, and forms a bottom part of the machine body 2. The prime mover E1 is mounted on the swivel base plate 9. Vertical ribs 9L and 9R, which are reinforcement members, are provided on the upper surface of the swivel base plate 9 so as to extend from a front part to a back part of a central region of the upper surface. The vertical rib 9L is disposed on one side of the center of the machine body 2 in the width direction K2, and the vertical rib 9R is disposed on the other side of the center. A swivel frame, which serves as the frame of the machine body 2, is formed on the swivel base plate 9 because, in addition to the vertical ribs 9L and 9R, members for supporting objects, such as devices, to be mounted on the machine body 2 and the like are provided on the swivel base plate 9. The periphery of the swivel frame in the horizontal direction is covered by a swivel cover.

A weight 10 is provided in a back part of the machine body 2. The weight 10 is disposed in the back part of the machine body 2, and a lower part of the weight 10 is attached to the swivel base plate 9.

As illustrated in FIG. 2, a fuel tank T1 and a hydraulic fluid tank T2, which are arranged in the machine-body-width direction K2, are installed in the back part of the machine body 2. The fuel tank T1 stores the fuel of the prime mover E1. The hydraulic fluid tank T2 stores a hydraulic fluid.

As illustrated in FIG. 2, a swivel motor MT is disposed on a front part of the swivel base plate 9 (the machine body 2) at a central part in the machine-body-width direction K2, and the swivel motor MT drives the swivel base plate 9 to swivel around the swivel axis X1. The swivel motor MT is a hydraulic motor (hydraulic actuator). A swivel joint (hydraulic device) S1 is provided at the swivel axis X1 position. The swivel joint S1 is a hydraulic device that distributes a hydraulic fluid, and is a rotary joint that distributes a hydraulic fluid between a hydraulic device on the machine body 2 side and a hydraulic device on the traveling device 3 side. The swivel motor MT is disposed in front of the swivel joint S1. A control valve (hydraulic device) CV is disposed behind the swivel joint S1. The control valve CV is a sectional-type composite control valve (hydraulic device) including a plurality of control valves that are stacked and joined in the up-down direction. A controller U1 is provided below the cabin 5.

A steering device 1B, for steering the working machine 1, is provided in the cabin 5. The steering device 1B is set in front of the operator's seat 6. The operator's seat 6 and the steering device 1B constitute an operation unit 1C.

As illustrated in FIG. 2, the machine body 2 has a support bracket 13 in a front central part thereof that is slightly toward the right in machine-body-width direction K2. The support bracket 13 is fixed to the front parts of the vertical ribs 9L and 9R, and protrudes forward from the machine body 2.

As illustrated in FIGS. 1 and 2, a swing bracket 14 is attached to a front part of the support bracket 13 (a part protruding from the machine body 2) via a swing shaft 14A so as to be swingable around a vertical axis (an axis extending in the up-down direction). Accordingly, the swing bracket 14 is rotatable in the machine-body-width direction K2 (a horizontal direction around the swing shaft 14A).

As illustrated in FIG. 2, the swing bracket 14 is disposed at a position that is in front of the swivel axis X1 and at which at least a part of the swing bracket 14 overlaps the center line Y1 when a boom 15 (described below) is oriented in the machine-body-forward direction. The center line Y1 is positioned (at substantially the midpoint) between a line Y2, which extends in the front-back direction and passes through the axis (swing axis) X2 of the swing shaft 14A, and the right side surface of the cabin 5.

As illustrated in FIG. 1, the working device 4 is supported by the swing bracket 14 (the machine body 2) so as to be rotatable around the swing axis X2. The working device 4 includes the boom 15, an arm 16, and a working tool (bucket) 17. A base part of the boom 15 is pivotably supported by an upper part of the swing bracket 14 via a pivot shaft. To be specific, in a state in which the boom 15 is oriented in the machine-body-forward direction, the base part of the boom 15 is pivotably attached to the upper part of the swing bracket 14 so as to be rotatable around a horizontal axis (an axis extending in the machine-body-width direction K2). Therefore, the boom 15 is swingable in the up-down direction. The boom 15, when in the maximally-raised position illustrated FIG. 1, is bent so that a central part thereof in the longitudinal direction is convex backward.

The arm 16 is pivotably supported by a distal end part of the boom 15 via a pivot shaft. To be specific, in a state in which the boom 15 is oriented in the machine-body-forward direction, the arm 16 is pivotably attached to the boom 15 so as to be rotatable around a horizontal axis. Therefore, the arm 16 is swingable in the front-back direction K1 or in the up-down direction. The arm 16 is swingable in a direction (crowd direction) such that the arm 16 moves toward the boom 15 and in a direction (dump direction) such that the arm 16 moves away from the boom 15.

The working tool 17 is pivotably supported by a distal end part of the arm 16 via a pivot shaft. To be specific, in a state in which the boom 15 is oriented in the machine-body-forward direction, the working tool 17 is attached to the arm 16 so as to be rotatable around a horizontal axis. Therefore, the working tool 17 is swingable in a direction (crowd direction) such that the working tool 17 moves toward the arm 16 and in a direction (dump direction) such that the working tool 17 moves away from the arm 16. The bucket, as the working tool 17, is provided on the arm 16 so that the bucket can perform a shoveling movement and a dumping movement. A shoveling movement is a movement such that the working tool 17 swings toward the boom 15, and is performed, for example, to shovel earth, sand, and the like. A dumping movement is a movement such that the working tool 17 swings away from the boom 15, and is performed, for example, to dump (discharge) shoveled earth, sand, and the like.

Instead of a bucket, any of the following can be attached as the working tool 17: a working tool (attachment) such as a pallet fork or a manure fork; or a working tool (hydraulic attachment) including a hydraulic actuator, such as a grapple, a hydraulic crusher, an angle boom, an earth auger, a snow blower, a sweeper, a mower, or a hydraulic breaker.

The swing bracket 14 is swingable by causing a swing cylinder C2, which is provided in the machine body 2, to extend and contract. The boom 15 is swingable by causing a boom cylinder C3 to extend and contract. The arm 16 is swingable by causing an arm cylinder C4 to extend and contract. The working tool 17 is swingable by causing a working tool cylinder (bucket cylinder) C5 to extend and contract. The swing cylinder C2, the boom cylinder C3, the arm cylinder C4, and the working tool cylinder C5 each include a hydraulic cylinder (hydraulic actuator).

Next, referring to FIGS. 3 to 7, a hydraulic system for actuating the hydraulic actuators ML, MR, MT, and C1 to C6, which are installed in the working machine 1, will be described.

Figure 3:
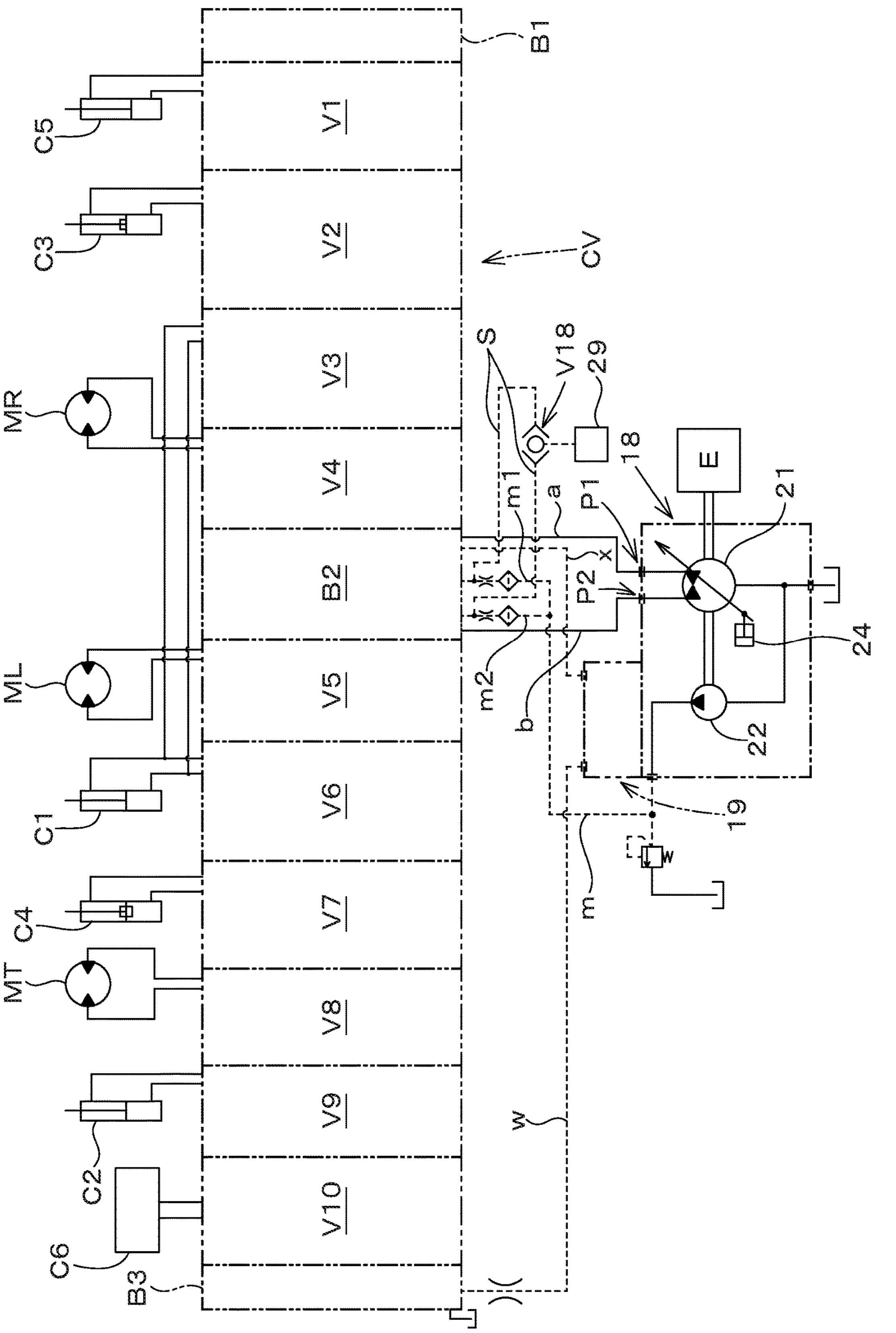
FIG. 3 is a schematic view of a hydraulic system.

As illustrated in FIG. 3, the hydraulic system includes the control valve CV, the hydraulic-fluid-supplying unit 18, and a flow rate controller 19.

The control valve CV is formed by arranging, in one direction, control valves V1 to V10 that control the hydraulic actuators ML, MR, MT, and C1 to C6, an inlet block B2 for taking in a hydraulic fluid, a pair of outlet blocks B1 and B3 for discharging the fluid.

As illustrated in FIG. 3, the control valve CV in the present embodiment includes the following components that are sequentially arranged (from the right side in FIG. 3) and coupled to each other: a first outlet block B1, a working-tool control valve V1 that controls the working tool cylinder C5, a boom control valve V2 that controls the boom cylinder C3, a first dozer-control valve V3 that controls the dozer cylinder C1, a second traveling-control valve V4 that controls the traveling motor MR of the second traveling device 3R, an inlet block B2, a first traveling-control valve V5 that controls the traveling motor ML of the first traveling device 3L, a second dozer-control valve V6 that controls the dozer cylinder C1, an arm control valve V7 that controls the arm cylinder C4, a swivel control valve V8 that controls the swivel motor MT, a swing control valve V9 that controls the swing cylinder C2, an SP control valve V10 that controls the hydraulic actuator C6 installed in a hydraulic attachment when the hydraulic attachment is attached as the working tool 17, and a second outlet block B3.

As illustrated in FIGS. 4 to 7, each of the control valves V1 to V10 includes, in a valve body thereof, a corresponding one of direction switching valves DV1 to DV10 and a pressure compensation valve (compensator valve) V11. The direction switching valves DV1 to DV10 each switch a direction of a hydraulic fluid for a corresponding one of the hydraulic actuators ML, MR, MT, and C1 to C6, which are controlled objects. The pressure compensation valve V11 is disposed at a position that is downstream of each of the direction switching valves DV1 to DV10 in the hydraulic-fluid supply path and that is upstream of each of the hydraulic actuators ML, MR, MT, and C1 to C6, which are controlled objects, in the hydraulic-fluid supply path. The pressure compensation valve V11 functions to adjust loads on the hydraulic actuators ML, MR, MT, and C1 to C6 when a plurality of the control valves V1 to V10 are used.

The first outlet block B1 includes a first relief valve V12 and a first unload valve V13, and the inlet block B2 includes a traveling independent valve V14. The first relief valve V12 is a main relief valve that regulates the pressure of a hydraulic fluid output from a first pressure-fluid delivery port P1 (described below).

The traveling independent valve V14 includes a pilot-operation switching valve that includes a linear-spool switching valve and that is operated and switched by using a pilot pressure.

The second outlet block B3 includes a second relief valve V15 and a second unload valve V16. The second relief valve V15 is a main relief valve that regulates the pressure of a hydraulic fluid output from a second pressure-fluid delivery port P2 (described below).

Each of the direction switching valves DV1 to DV10 includes a linear-spool switching valve. Each of the direction switching valves DV1 to DV10 is a control valve that is electrically controlled by the controller U1. To be specific, for example, a pilot solenoid valve is used as each of the direction switching valves DV1 to DV10. A pilot solenoid valve controls flow of a hydraulic fluid by using a pilot pressure that is controlled by a solenoid.

Figure 8:
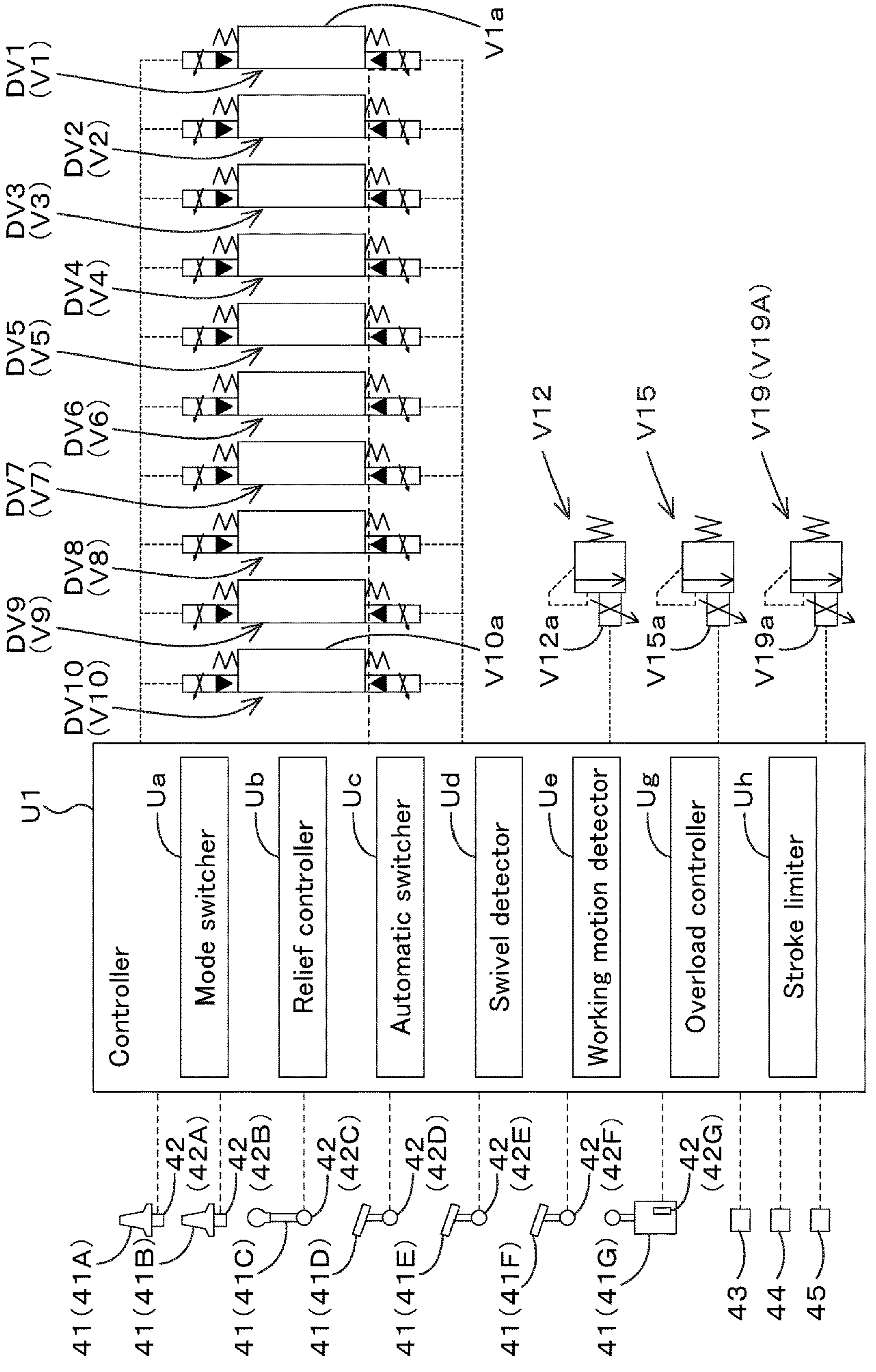
FIG. 8 is a schematic view of a control system.

As illustrated in FIG. 8, the solenoids of the direction switching valves DV1 to DV10 are connected to the controller U1, and the direction switching valves DV1 to DV10 are switched by using pilot pressures corresponding to instruction signals (electric-current values) transmitted from the controller U1. Operation members 41 (first to seventh operation actuators 41A to 41G) for operating the direction switching valves DV1 to DV10 are connected to the controller U1. The controller U1 transmits electric-current values corresponding to the operation amounts of the operation members 41 to the solenoids of the direction switching valves DV1 to DV10 to be operated. The first operation actuator 41A, the second operation actuator 41B, the third operation actuator 41C, and the seventh operation actuator 41G are provided, for example, in the steering device 1B, and each include a handle or a lever that is gripped and operated by an operator sitting on the operator's seat 6. The fourth operation actuator 41D, the fifth operation actuator 41E, and the sixth operation actuator 41F are provided, for example, on a floor part in front of the operator's seat 6, and each include a pedal that is depressed and operated by the operator.

The first operation actuator 41A can operate two operation targets that are installed in the working machine 1. For example, the first operation actuator 41A can operate the direction switching valve DV8 (can operate and swivel the machine body 2) and can operate the direction switching valve DV7 (can operate and swing the arm 16). The first operation actuator 41A includes a sensor 42 (first sensor 42A) for detecting an operation direction and an operation amount. The first sensor 42A is connected to the controller U1. The controller U1 controls the swivel control valve V8 and the arm control valve V7 based on a detection signal from the first sensor 42A.

The second operation actuator 41B also can operate two operation targets that are installed in the working machine 1. For example, the second operation actuator 41B can operate the direction switching valve DV2 (can operate and swing the boom 15) and can operate the direction switching valve DV1 (can operate and swing the working tool 17). The second operation actuator 41B includes a sensor (movement detector) 42 (second sensor 42B) for detecting an operation direction and an operation amount. Although the configuration of the second sensor 42B is not particularly limited, for example, a potentiometer or the like can be used as the second sensor 42B. The second sensor 42B is connected to the controller U1. The controller U1 controls the boom control valve V2 and the working-tool control valve V1 based on a detection signal from the second sensor 42B.

The third operation actuator 41C can operate the direction switching valve DV3 and the direction switching valve DV6 (can operate the dozer 7). The third operation actuator 41C includes a sensor 42 (third sensor 42C) for detecting an operation direction and an operation amount. The third sensor 42C is connected to the controller U1. The controller U1 controls the first dozer-control valve V3 and the second dozer-control valve V6 based on a detection signal from the third sensor 42C.

The fourth operation actuator 41D can operate the direction switching valve DV9 (can operate the swing bracket 14). The fourth operation actuator 41D includes a sensor 42 (fourth sensor 42D) for detecting an operation direction and an operation amount. The fourth sensor 42D is connected to the controller U1. The controller U1 controls the swing control valve V9 based on a detection signal from the fourth sensor 42D.

The fifth operation actuator 41E can operate the direction switching valve DV5 (can operate the first traveling device 3L). The fifth operation actuator 41E includes a sensor 42 (fifth sensor 42E) for detecting an operation direction and an operation amount. The fifth sensor 42E is connected to the controller U1. The controller U1 controls the first traveling-control valve V5 based on a detection signal from the fifth sensor 42E.

The sixth operation actuator 41F can operate the direction switching valve DV4 (can operate the second traveling device 3R). The sixth operation actuator 41F includes a sensor 42 (sixth sensor 42F) for detecting an operation direction and an operation amount. The sixth sensor 42F is connected to the controller U1. The controller U1 controls the second traveling-control valve V4 based on a detection signal from the sixth sensor 42F.

The seventh operation actuator 41G can operate the direction switching valve DV10 (can operate a hydraulic attachment as a working tool). The seventh operation actuator 41G includes a sensor 42 (seventh sensor 42G) for detecting an operation direction and an operation amount. The seventh sensor 42G is connected to the controller U1. The controller U1 controls the SP control valve V4 based on a detection signal from the seventh sensor 42G.

The first to seventh sensors 42A to 42G each include, for example, a position sensor and the like.

The spools of the direction switching valves DV1 to DV10 are configured to be moved in proportion to the operation amounts of the operation members 41, for operating the direction switching valves DV1 to DV10, so as to supply hydraulic fluids, to the hydraulic actuators ML, MR, MT, and C1 to C6 of the controlled objects, in the amounts proportional to the amounts by which the direction switching valves DV1 to DV10 are moved. The actuation speeds of the operation targets (controlled objects) can be changed in proportion to the operation amounts of the operation members 41.

A hydraulic pump, as a hydraulic-fluid supply source, of the hydraulic system includes: a first pump 21 for supplying a hydraulic fluid for actuating the hydraulic actuators ML, MR, MT, and C1 to C6; and a second pump 22 for supplying a signal hydraulic fluid for a pilot pressure, a detection signal, or the like.

The first pump 21 and the second pump 22 are included in the hydraulic-fluid-supplying unit 18, and is driven by the prime mover E1.

In the present embodiment, the first pump 21 is a swash-plate variable displacement axial pump that has a function of an equal-flow-rate double pump that delivers hydraulic fluids with equal flow rates from two pressure-fluid delivery ports P1 and P2 that are independent from each other. To be specific, a split-flow hydraulic pump is used as the first pump 21. The split-flow hydraulic pump has a mechanism for delivering a hydraulic fluid from one piston-cylinder barrel kit alternately to delivery grooves formed inside and outside of a valve plate.

One of the pressure-fluid delivery ports of the first pump 21 will be referred to as a first pressure-fluid delivery port P1, and the other pressure-fluid delivery port of the first pump 21 will be referred to as a second pressure-fluid delivery port P2.

In the present embodiment, the first and second pressure-fluid delivery ports P1 and P2 are pressure-fluid delivery ports of a hydraulic pump having two pump functions. Alternatively, the first pressure-fluid delivery port may be the pressure-fluid delivery port of one of two hydraulic pumps that are independently formed, and the second pressure-fluid delivery port may be the pressure-fluid delivery port of the other hydraulic pump.

The hydraulic-fluid-supplying unit 18 includes a pressing piston 23 that presses the swash plate of the first pump 21, and a flow-rate compensating piston 24 that controls the swash plate of the first pump 21.

The first pump 21 is configured so that the swash plate thereof is pressed in a direction such that the pump flow rate increases via the pressing piston 23 due to the self-pressure of the first pump 21, and is configured so as to apply a force against the pressing force of the pressing piston 23 to the swash plate by using the flow-rate compensating piston 24. The first pump 21 controls the delivery flow rate of the first pump 21 by controlling a pressure applied to the flow-rate compensating piston 24.

Accordingly, when the pressure applied to the flow-rate compensating piston 24 is relieved, the swash plate angle of the first pump 21 becomes the maximum and the first pump 21 delivers a maximum flow rate.

The flow rate controller 19 performs swash-plate control of the first pump 21. The swash-plate control of the first pump 21 is performed by controlling a pressure applied to the flow-rate compensating piston 24 by controlling a flow-rate compensating valve V17 that is installed in the flow rate controller 19.

The hydraulic-fluid-supplying unit 18 is provided with a spring 25 and a spool 26 for controlling the pump power (torque) of the first pump 21. The hydraulic-fluid-supplying unit 18 is configured so as to limit the power (torque) that the first pump 21 absorbs from the prime mover E1 when the delivery pressure of the first pump 21 becomes a preset pressure.

The second pump 22 includes a fixed displacement gear pump, and the delivery fluid of the second pump 22 is delivered from a third pressure-fluid delivery port P3.

The first pressure-fluid delivery port P1 is connected to the inlet block B2 via a first delivery passage a, and the second pressure-fluid delivery port P2 is connected to the inlet block B2 via a second delivery passage b.

The first delivery passage a is connected to a first hydraulic-fluid supply passage d. The first hydraulic-fluid supply passage d extends from the inlet block B2 to the first outlet block B1 via the valve body of the second traveling-control valve V4, the valve body of the first dozer-control valve V3, the valve body of the boom control valve V2, and the valve body of the working-tool control valve V1. The first hydraulic-fluid supply passage d branches in the first outlet block B1 (in a terminal-end part of the flow passage) and is connected to the first relief valve V12 and the first unload valve V13.

A hydraulic fluid can be supplied, via a hydraulic-fluid branch passage f, from the first hydraulic-fluid supply passage d to the direction switching valves DV4, DV3, DV2, and DV1 of the second traveling-control valve V4, the first dozer-control valve V3, the boom control valve V2, and the working-tool control valve V1.

The first relief valve V12 and the first unload valve V13 are connected to a drain fluid passage g. The drain fluid passage g extends from the first outlet block B1 to the second outlet block B3 via the valve body of the working-tool control valve V1, the valve body of the boom control valve V2, the valve body of the first dozer-control valve V3, the valve body of the second traveling-control valve V4, the inlet block B2, the valve body of the first traveling-control valve V5, the valve body of the second dozer-control valve V6, the valve body of the arm control valve V7, the valve body of the swivel control valve V8, the valve body of the swing control valve V9, and the valve body of the SP control valve V10. A hydraulic fluid that flows in the drain fluid passage g is discharged from the second outlet block B3 to the hydraulic fluid tank T2.

The second delivery passage b is connected to a second hydraulic-fluid supply passage e. The second hydraulic-fluid supply passage e extends from the inlet block B2 to the second outlet block B3 via the valve body of the first traveling-control valve V5, the valve body of the second dozer-control valve V6, the valve body of the arm control valve V7, the valve body of the swivel control valve V8, the valve body of the swing control valve V9, and the valve body of the SP control valve V10. The second hydraulic-fluid supply passage e branches in the second outlet block B3 (in a terminal-end part of the flow passage) and is connected to the second relief valve V15 and the second unload valve V16.

A hydraulic fluid can be supplied, via hydraulic-fluid branch passages h, from the second hydraulic-fluid supply passage e to the direction switching valves DV5, DV6, DV7, DV8, DV9, and DV10 of the first traveling-control valve V5, the second dozer-control valve V6, the arm control valve V7, the swivel control valve V8, the swing control valve V9, and the SP control valve V10.

The hydraulic fluid supplied to the control valves V1 to V10 is supplied to and discharged from the hydraulic actuators ML, MR, MT, and C1 to C6. That is, the hydraulic system includes a hydraulic circuit that supplies a hydraulic fluid to and discharges the hydraulic fluid from the hydraulic actuators ML, MR, MT, and C1 to C6.

The second relief valve V15 and the second unload valve V16 are connected to the drain fluid passage g. The first hydraulic-fluid supply passage d and the second hydraulic-fluid supply passage e are connected to each other in the inlet block B2 via a communication passage j that passes across the traveling independent valve V14.

The traveling independent valve V14 is switchable between an independent position 27 in which the traveling independent valve V14 prohibits flow of a hydraulic fluid in the communication passage j and a flow-joining position 28 in which the traveling independent valve V14 allows flow of a hydraulic fluid in the communication passage j.

When the traveling independent valve V14 is switched to the independent position 27, a hydraulic fluid from the first pressure-fluid delivery port P1 can be supplied to the direction switching valves DV4 and DV3 of the second traveling-control valve V4 and the first dozer-control valve V3, a hydraulic fluid from the second pressure-fluid delivery port P2 can be supplied to the direction switching valves DV5 and DV6 of the first traveling-control valve V5 and the second dozer-control valve V6, a hydraulic fluid from the first pressure-fluid delivery port P1 is not supplied to the first traveling-control valve V5 and the second dozer-control valve V6, and a hydraulic fluid from the second pressure-fluid delivery port P2 is not supplied to the second traveling-control valve V4 and the first dozer-control valve V3.

When the traveling independent valve V14 is switched to the flow-joining position 28, a hydraulic fluid from the first pressure-fluid delivery port P1 and a hydraulic fluid from the second pressure-fluid delivery port P2 join together and can be supplied to the direction switching valves DV1 to DV10 of the control valves V1 to V10.

The third pressure-fluid delivery port P3 is connected to the inlet block B2 via a third delivery passage m. The third delivery passage m branches into a first branch fluid passage m1 and a second branch fluid passage m2, and is connected to the inlet block B2.

The first branch fluid passage m1 is connected via the first signal-fluid passage n1 to a pressure receiver 14*a* on one side of the traveling independent valve V14, and the second branch fluid passage m2 is connected via a second signal-fluid passage n2 to a pressure receiver 14*b* on the other side of the traveling independent valve V14.

A first detection-fluid passage r1 is connected to the first signal-fluid passage n1, and the second detection-fluid passage r2 is connected to the second signal-fluid passage n2.

The first detection-fluid passage r1 is connected from the first signal-fluid passage n1 to the drain fluid passage g via the direction switching valve DV6 of the second dozer-control valve V6, the direction switching valve DV5 of the first traveling-control valve V5, the direction switching valve DV4 of the second traveling-control valve V4, and the direction switching valve DV3 of the first dozer-control valve V3.

The second detection-fluid passage r2 is connected from the second signal-fluid passage n2 to the drain fluid passage g via the direction switching valve DV10 of the SP control valve V10, the direction switching valve DV9 of the swing control valve V9, the direction switching valve DV8 of the swivel control valve V8, the direction switching valve DV7 of the arm control valve V7, the direction switching valve DV6 of the second dozer-control valve V6, the direction switching valve DV5 of the first traveling-control valve V5, the direction switching valve DV4 of the second traveling-control valve V4, the direction switching valve DV3 of the first dozer-control valve V3, the direction switching valve DV2 of the boom control valve V2, and the direction switching valve DV1 of the working-tool control valve V1.

When the direction switching valves DV1 to DV10 of the control valves V1 to V10 are neutral, the traveling independent valve V14 is held in the flow-joining position 28 by a spring force.

When any of the direction switching valves DV of the second traveling-control valve V4, the first traveling-control valve V5, the first dozer-control valve V3, and the second dozer-control valve V6 is operated from the neutral position, a pressure is applied to the first detection-fluid passage r1 and the first signal-fluid passage n1, and the traveling independent valve V14 is switched from the flow-joining position 28 to the independent position 27.

Accordingly, when the working machine 1 is only traveling, when the dozer 7 is used while the working machine 1 is traveling, or when only the dozer 7 is used, a hydraulic fluid from the first pressure-fluid delivery port P1 is supplied to the direction switching valves DV of the second traveling-control valve V4 and the first dozer-control valve V3, and a hydraulic fluid from the second pressure-fluid delivery port P2 is supplied to the direction switching valves DV of the first traveling-control valve V5 and the first dozer-control valve V3.

At this time, when any of the direction switching valves DV10, DV9, DV8, DV7, DV2, and DV1 of the SP control valve V10, the swing control valve V9, the swivel control valve V8, the arm control valve V7, the boom control valve V2, and the working-tool control valve V1 is operated from the neutral position, a pressure is applied to the second detection-fluid passage r2 and the second signal-fluid passage n2, and the traveling independent valve V14 is switched from the independent position 27 to the flow-joining position 28.

In a case where the direction switching valves DV1 to DV10 of the control valves V1 to V10 are neutral, when any of the direction switching valves DV10, DV9, DV8, DV7, DV2, and DV1 of the SP control valve V10, the swing control valve V9, the swivel control valve V8, the arm control valve V7, the boom control valve V2, and the working-tool control valve V1 is operated from the neutral position, the traveling independent valve V14 is in the flow-joining position 28.

Accordingly, when the working machine 1 is traveling or is not traveling, the boom 15, the arm 16, the working tool 17, the swing bracket 14, the machine body 2, the dozer 7 can be simultaneously operated.

The hydraulic system includes an auto-idling control system (AI system) that automatically operates the accelerator of the prime mover E1.

The AI system includes: an AI switch (pressure switch) 29 that is connected to the first branch fluid passage m1 and the second branch fluid passage m2 of the third delivery passage m via a sensing fluid passage s and a shuttle valve V18; an electric actuator that controls the governor of the prime mover E1; and a controller that controls the electric actuator. The AI switch 29 is connected to the controller.

With the AI system, when the direction switching valves DV1 to DV10 of the control valves V1 to V10 are neutral, a pressure is not applied to the first branch fluid passage m1 and the second branch fluid passage m2, and thus the AI switch 29 is not pressure-activated. In this state, the governor is automatically controlled by the electric actuator and the like so that the governor is downshifted to a preset idling position.

When any of the direction switching valves DV1 to DV10 of the control valves V1 to V10 is operated, a pressure is applied to the first branch fluid passage m1 or the second branch fluid passage m2, the pressure is detected by the AI switch 29, and the AI switch 29 is pressure-activated. Then, an instruction signal is output from the controller to the electric actuator and the like, and the governor is automatically controlled by the electric actuator and the like so as to be upshifted to a set accelerated position.

A load sensing system is used in the hydraulic system.

The load sensing system of the present embodiment includes: the pressure compensation valves V11 provided in the control valves V1 to V10; the flow-rate compensating piston 24 that controls the swash plate of the first pump 21; the flow-rate compensating valve V17 installed in the flow rate controller 19; the first and second relief valves V12 and V15; and the first and second unload valves V13 and V16.

The load sensing system of the present embodiment is an after-orifice type load sensing system in which the pressure compensation valves V11 are disposed downstream of the direction switching valves DV1 to DV10 in the hydraulic-fluid supply path.

With the load sensing system, when more than one of the hydraulic actuators ML, MR, MT, and C1 to C6 installed in the working machine 1 are simultaneously operated, the pressure compensation valves V11 function to: adjust the load on the hydraulic actuators ML, MR, MT, and C1 to C6; generate a pressure loss corresponding to the difference in pressure from the highest load pressure in the low-load control valves V1 to V10; and allow a hydraulic fluid to flow (distribute a hydraulic fluid) at flow rates in accordance with the operation amounts of the spools of the direction switching valves DV1 to DV10, irrespective of the magnitude of the load.

The load sensing system can save power and improve operability by controlling the delivery flow rate of the first pump 21 in accordance with load pressures of the hydraulic actuators ML, MR, MT, and C1 to C6 installed in the working machine 1 to deliver hydraulic power needed for the loads.

The load sensing system of the present embodiment will be described in further detail.

The load sensing system includes: a PLS-signal fluid passage w that transmits the highest load pressure among the load pressures the control valves V1 to V10 to the flow-rate compensating valve V17 as a PLS signal pressure; and a PPS-signal fluid passage x that transmits the delivery pressure of the first pump 21 to the flow-rate compensating valve V17 as a PPS signal pressure.

The PLS-signal fluid passage w is provided so as to extend from the first outlet block B1 through the valve body of the working-tool control valve V1, the valve body of the boom control valve V2, the valve body of the first dozer-control valve V3, and the valve body of the second traveling-control valve V4; and is provided so as to extend across the traveling independent valve V14 and through the valve body of the first traveling-control valve V5, the valve body of the second dozer-control valve V6, the valve body of the arm control valve V7, the valve body of the swivel control valve V8, the valve body of the swing control valve V9, the valve body of the SP control valve V10, and the second outlet block B3. The PLS-signal fluid passage w is connected, in each control valve, to the pressure compensation valve V11 via a load transmission line y.

The PLS-signal fluid passage w is connected from the second outlet block B3 to one side of the spool of the flow-rate compensating valve V17, and the PLS signal pressure is applied to the one side of the spool of the flow-rate compensating valve V17.

Moreover, the PLS-signal fluid passage w is connected to the first unload valve V13 and the drain fluid passage g in the first outlet block B1, and is connected to the second unload valve V16 and the drain fluid passage g in the second outlet block B3.

When the traveling independent valve V14 is in the flow-joining position 28, a line w1 of the PLS-signal fluid passage w from the traveling independent valve V14 to the first outlet block B1 and a line w2 of the PLS-signal fluid passage w from the traveling independent valve V14 to the second outlet block B3 communicate with each other. When the traveling independent valve V14 is switched from the flow-joining position 28 to the independent position 27, the PLS-signal fluid passage w is blocked by the traveling independent valve V14.

Therefore, when the traveling independent valve V14 is switched to the independent position 27, the PLS-signal fluid passage w is divided into the line w1 to which a hydraulic fluid is supplied from the first pressure-fluid delivery port P1 and the line w2 to which a hydraulic fluid is supplied from the second pressure-fluid delivery port P2.

The PPS-signal fluid passage x is provided so as to extend from the traveling independent valve V14 to the other side of the spool of the flow-rate compensating valve V17. When the traveling independent valve V14 is in the flow-joining position 28, the PPS-signal fluid passage x communicates with the second hydraulic-fluid supply passage e via a connection fluid passage z, and a PPS signal pressure (the delivery pressure of the first pump 21) is applied to the other side of the spool of the flow-rate compensating valve V17. When the traveling independent valve V14 is switched to the independent position 27, the PPS-signal fluid passage x communicates with the drain fluid passage g via a relief fluid passage q and the PPS signal pressure becomes zero.

A spring 30 and a pressure difference piston 31, which apply a control pressure difference to the flow-rate compensating valve V17, are provided on the one side of the spool of the flow-rate compensating valve V17.

With the hydraulic system having the above configuration, when the direction switching valves DV1 to DV10 of the control valves V1 to V10 are in neutral positions, the traveling independent valve V14 is in the flow-joining position 28. At this time, a terminal end part of the first hydraulic-fluid supply passage d is blocked by the first unload valve V13, and a terminal end part of the second hydraulic-fluid supply passage e is blocked by the second unload valve V16. Accordingly, when the delivery pressure of the first pump 21 (PPS signal pressure) increases and the difference between the PPS signal pressure and the PLS signal pressure (zero at this time) becomes greater than the control pressure difference. the first pump 21 is flow-rate-controlled so that the delivery flow rate decreases, and the first and second unload valves V16 are opened to allow a delivery fluid from the first pump 21 to flow down to the hydraulic fluid tank T2.

Accordingly, in this state, the delivery pressure of the first pump 21 is a pressure that is set by the first and second unload valves V13 and V16, and the delivery flow rate of the first pump 21 is the minimum delivery flow rate.

Next, a case where two or more of the boom cylinder C3, the arm cylinder C4, the working tool cylinder C5, the swing cylinder C2, the swivel motor MT, and the hydraulic attachment are simultaneously operated or a case where one or more of these and one or more of the left and right traveling motors ML and MR and the dozer cylinder C1 are simultaneously operated will be described.

In this case, the traveling independent valve V14 is in the flow-joining position 28, the highest load pressure applied to the operated hydraulic actuators ML, MR, MT, and C1 to C6 is the PLS signal pressure, and the delivery pressure of the first pump 21 (delivery flow rate) is automatically controlled so that the difference between the PPS signal pressure and the PLS signal pressure becomes a control pressure difference (so that the difference between the PPS signal pressure and the PLS signal pressure is maintained at a set value).

That is, when the unload flow rate via the first and second unload valves V13 and V16 becomes zero, the delivery flow rate of the first pump 21 starts to increase, and, in accordance with the operation amount of the operated control valve, the entire amount of the delivery fluid of the first pump 21 flows to the operated hydraulic actuators ML, MR, MT, and C1 to C6.

Moreover, the pressure difference across each the spools of the direction switching valves DV1 to DV10 of the operated control valves V1 to V10 becomes constant due to the pressure compensation valve V11, and irrespective of the magnitude of loads that are applied to the operated hydraulic actuators ML, MR, MT, and C1 to C6, the delivery flow rate of the first pump 21 is distributed to the operated hydraulic actuators ML, MR, MT, and C1 to C6 in accordance with the operation amounts.

When the required flow rate of the hydraulic actuators ML, MR, MT, and C1 to C6 exceeds the maximum delivery flow rate of the first pump 21, the delivery fluid of the first pump 21 is proportionally allocated to the operated hydraulic actuators ML, MR, MT, and C1 to C6.

In this case, a simultaneous operation (operation in combination) can be performed by using an efficient system.

Next, a case where the working machine 1 performs earthwork by using the dozer 7 while traveling will be described.

In this case, the traveling independent valve V14 is switched to the independent position 27, the communication passage j and the PLS-signal fluid passage w are blocked by the traveling independent valve V14, the PPS-signal fluid passage x communicates with the drain fluid passage g via the relief fluid passage q, and the PPS signal pressure becomes zero.

Accordingly, a hydraulic fluid from the first pressure-fluid delivery port P1 flows to the second traveling-control valve V4 and the first dozer-control valve V3, and does not flow to the first traveling-control valve V5 and the second dozer-control valve V6. A hydraulic fluid from the second pressure-fluid delivery port P2 flows to the first traveling-control valve V5 and the second dozer-control valve V6, and does not flow to the traveling right control valve V4 and the first dozer-control valve V3. Moreover, because the PPS signal pressure is zero, the swash plate angle of the first pump 21 is the maximum and the first pump 21 outputs the maximum flow rate.

With the hydraulic system of the present embodiment, due to the first dozer-control valve V3 and the second dozer-control valve V6, a hydraulic fluid is evenly extracted from the first hydraulic-fluid supply passage d and the second hydraulic-fluid supply passage e and supplied to the dozer cylinder C1. Thus, the working machine 1 can travel straightly.

Moreover, when turning the working machine 1 in one of the left and right directions, the pressure compensation valve V11 performs flow-distributing control. Therefore, even if a load applied to the traveling motors ML and MR is high and a load applied to the dozer cylinder C1 is low, a hydraulic fluid more than a set flow rate does not flow into the dozer cylinder C1. Thus, an independent circuit configuration of independently suppling a hydraulic fluid from the first pressure-fluid delivery port P1 to the second traveling-control valve V4 and supplying a hydraulic fluid from the second pressure-fluid delivery port P2 to the first traveling-control valve V5 can be maintained, and a hydraulic fluid can be evenly extracted from the first and second pressure-fluid delivery ports P1 and P2. Therefore, a hydraulic fluid can be supplied to the traveling motors ML and MR with sufficient flow rates, and the working machine 1 can have sufficiently high turning ability.

For example, when only one dozer control valve is used to control the dozer cylinder, the dozer control valve receives a hydraulic fluid from one of the first hydraulic-fluid supply passage and the second hydraulic-fluid supply passage. In this case, when the hydraulic fluid is taken from the one of the hydraulic-fluid supply passages to the dozer cylinder, a problem arises in that the working machine 1, which is to travel straightly, may travel obliquely. Moreover, when the working machine 1 turns, the pressure loss of a hydraulic-fluid supply channel in which the dozer control valve is provided is large and movement becomes slow (to be specific, in a case where the dozer control valve is provided in the hydraulic-fluid supply channel from the first pressure-fluid delivery port P1, although the working machine 1 moves when turning leftward while operating the dozer 7, the movement of the working machine 1 becomes slow when turning rightward while operating the dozer 7).

It may be possible to control the dozer cylinder by using only one dozer control valve and to evenly supply a hydraulic fluid from both of the first hydraulic-fluid supply passage and the second hydraulic-fluid supply passage. In this case, however, although the linearity in traveling can be achieved, the turning ability considerably decreases.

That is, the turning ability considerably decreases because, when the working machine 1 turns, a high-flow rate hydraulic fluid flows into the dozer cylinder from the high-pressure-side hydraulic-fluid supply passage.

In this case, it is difficult to configure the load sensing system, because it cannot be decided in terms of the circuit configuration whether to perform flow-distributing control based on a signal of a hydraulic fluid from the first pressure-fluid delivery port P1 or to perform flow-distributing control based on a signal of a hydraulic fluid from the second pressure-fluid delivery port P2.

In a case where the working machine 1 performs earthwork by using the dozer 7 while traveling, because the PLS-signal fluid passage w is blocked when the traveling independent valve V14 is switched to the independent position 27, interference of load signals does not occur between the hydraulic-fluid supply channel from the first pressure-fluid delivery port P1 and the hydraulic-fluid supply channel from the second pressure-fluid delivery port P2. Thus, control with which a hydraulic fluid is distributed to the traveling control valves V4 and V5 and the dozer control valves V3 and V6 and an excessive hydraulic fluid is discharged from the unload valves V13 and V16 to the hydraulic fluid tank T2 can be performed independently in the circuit of the hydraulic-fluid supply channel from the first pressure-fluid delivery port P1 and in the circuit of the hydraulic-fluid supply channel from the second pressure-fluid delivery port P2. Accordingly, the function of the pressure compensation valve V11 can be sufficiently obtained.

In a case where only the traveling body 1A or only the dozer 7 is driven, as in the aforementioned case where the working machine 1 performs earthwork by using the dozer 7 while traveling, the traveling independent valve V14 is switched to the independent position 27, the communication passage j and the PLS-signal fluid passage w are blocked by the traveling independent valve V14, and the PPS-signal fluid passage x communicates with the drain fluid passage g via a relief fluid passage, and the PPS signal pressure becomes zero.

Because the traveling control valves V4 and V5 are disposed on the most upstream side of the hydraulic-fluid supply channel from the pressure-fluid delivery ports P1 and P2 of the first pump 21, it is possible to reduce the pressure loss in a hydraulic pipe passage from the first pump 21 to the traveling motors ML and MR.

In the hydraulic system configured as described above, the first pump 21, which is a split-flow hydraulic pump, cannot independently control the delivery flow rate from the first pressure-fluid delivery port P1 and the delivery flow rate from the second pressure-fluid delivery port P2. Therefore, the hydraulic system is configured so that the delivery flow rate of the first pump 21 becomes the maximum in a case where the first hydraulic-fluid supply passage d and the second hydraulic-fluid supply passage e are independent (are not joined). However, in a case where two hydraulic pumps are provided and the delivery port of one of the two hydraulic pumps is used as the first pressure-fluid delivery port P1 and the delivery port of the other hydraulic pump is used as the second pressure-fluid delivery port P2, even when the traveling independent valve V14 is in the independent position 27, the hydraulic pumps are configured to be independently controlled and to deliver only a necessary flow rate (also in this case, control may be performed so that the two hydraulic pumps simultaneously deliver the maximum flow rates when joined).

It may be possible to configure so that the traveling independent valve V14 is in the flow-joining position 28 when only the dozer 7 is operated. In this case, however, when the dozer 7 is operated while the working machine 1 travels, in order to hold the traveling independent valve V14 in the independent position 27, it is necessary to provide a third detection-fluid passage for detecting that the direction switching valve DV3 and DV6 of the dozer control valves V3 and V6 are operated, and the circuit configuration of the detection circuit becomes complicated. In the present embodiment, because of a configuration such that whether the traveling control valves V4 and V5 and/or the dozer control valves V3 and V6 are operated is detected in the first detection-fluid passage r1, the circuit configuration of the detection circuit can be simplified.

In the hydraulic system of the present embodiment, the traveling control valves V4 and V5, and the dozer control valves V3 and V6 are arranged side by side; and, the traveling control valve V4 and the dozer control valve V3, and the traveling control valve V5 and the dozer control valve V6, are disposed with the traveling independent valve V14 interposed therebetween. Therefore, it is possible to simplify the circuit configuration of a detection circuit for detecting that the traveling control valves V4 and V5 and/or the dozer control valves V3 and V6 are operated.

The arrangement of the control valves V1 to V10 and the inlet block B2 is not limited to the arrangement shown in the figures. The disposition of the control valve V1, V2, and V7 to V10 are not particularly limited, as long as: one of the traveling control valves V4 and V5, one of the dozer control valves V3 and V6, and one the outlet blocks B1 and B3 are provided in one of the hydraulic-fluid supply channels from two independent pressure-fluid delivery ports P1 and P2; and the other of the traveling control valves V4 and V5, the other of the dozer control valves V3 and V6, and the other of the outlet blocks B1 and B3 are provided in the other hydraulic-fluid supply channel.

The order of the control valves V1 to V10 in the arrangement direction is not limited.

Figure 4:
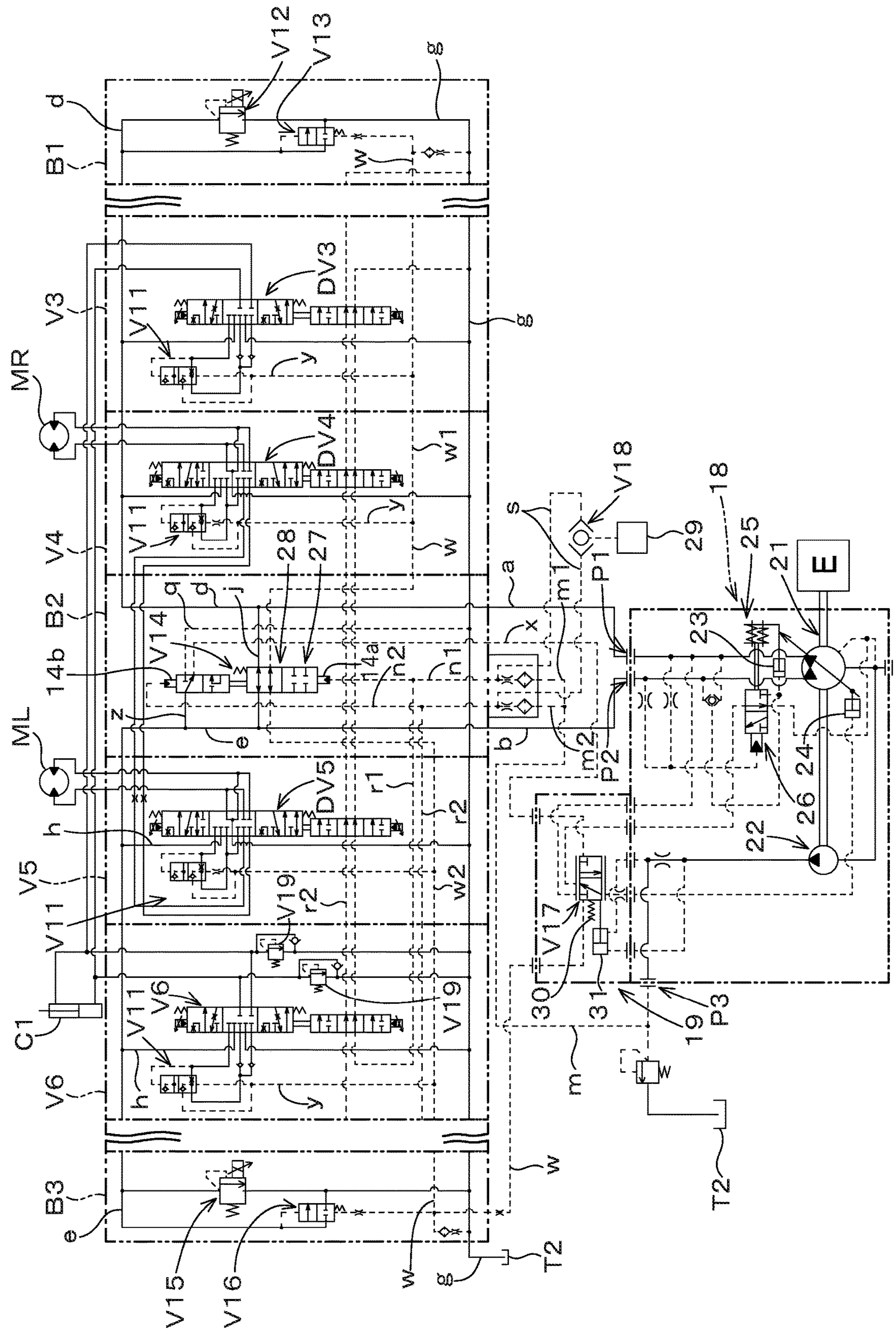
FIG. 4 is a circuit diagram of a part of the hydraulic system.

As illustrated in FIG. 4, the first relief valve V12 and the second relief valve V15 each include a solenoid variable relief valve. The first relief valve V12 and the second relief valve V15 (variable relief valves) variably regulate the pressure of a hydraulic fluid output from the first pump 21 (pump). Hereafter, a relief set pressure that is a set pressure regulated (set) by the first relief valve V12 and the second relief valve V15 will be referred to as a main relief pressure.

As illustrated in FIG. 8, a solenoid V12*a* of the first relief valve V12 and a solenoid V15*a* of the second relief valve V15 are connected to the controller U1. That is, the first relief valve V12 and the second relief valve V15 are controlled by the controller U1.

As illustrated in FIG. 9, the working machine 1 has a plurality of modes for changing the main relief pressure. In the present embodiment, the plurality of modes are a first mode (hard mode), a second mode (normal mode), and a third mode (soft mode). For example, the hard mode is a mode for performing standard work, the normal mode is a mode for performing light work, and the soft mode is a mode for performing ground-leveling work.

As illustrated in FIG. 8, a mode switch 43 is connected to the controller U1. The controller U1 includes a mode switcher Ua that switches between the modes. The mode switcher Ua switches the mode between the hard mode, the normal mode, and the soft mode when the mode switch 43 is operated.

Figure 10:
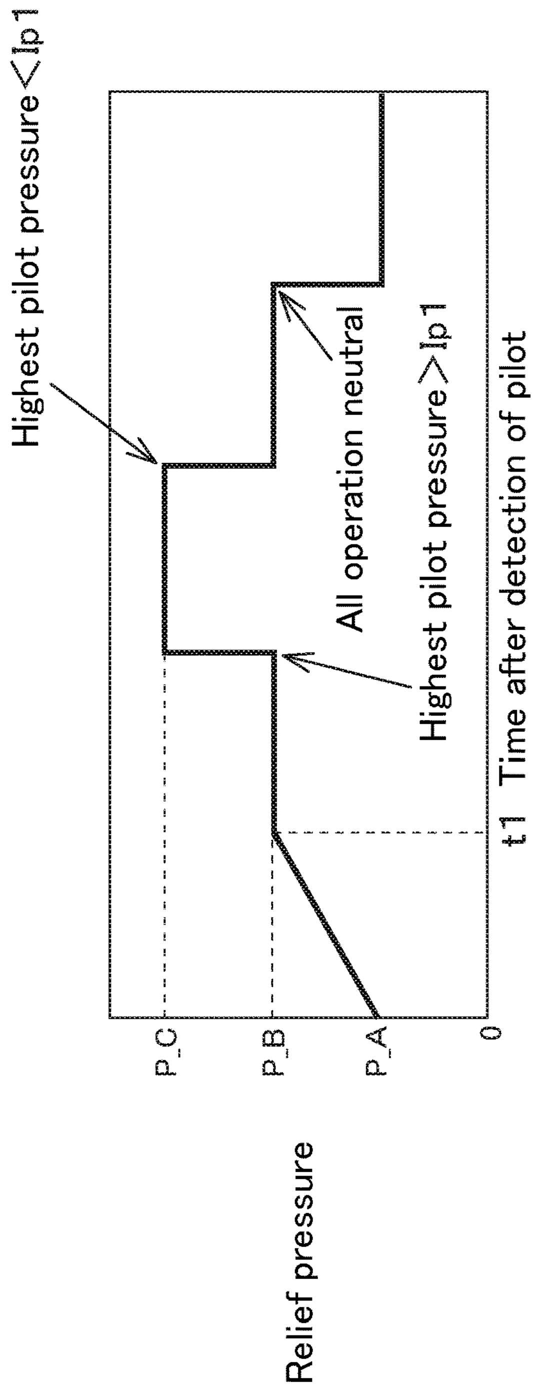
FIG. 10 is a graph illustrating change in the main relief pressure.

FIG. 9 is a table showing the set values of the main relief pressure of each mode. FIG. 10 is a graph illustrating change in the main relief pressure, with the vertical axis representing the main relief pressure and the horizontal axis representing the time. The set values of the main relief pressure shown in FIG. 9 are examples, are not limited, and may be changed in various ways.

In the following description, the term "command electric-current value" refers to an electric-current value that is transmitted from the controller U1 to the solenoids of the direction switching valves DV1 to DV10 and that corresponds to the operation amount of the operation member 41. The term "highest pilot pressure" refers to the highest one of the pilot pressures applied to the direction switching valves DV1 to DV10 corresponding to the operated hydraulic actuators ML, MR, MT, and C1 to C6 when a plurality of the hydraulic actuators ML, MR, MT, and C1 to C6 are operated. When only one of the hydraulic actuators ML, MR, MT, and C1 to C6 is operated, the highest pilot pressure is the pilot pressure applied to one of the direction switching valves DV1 to DV10 corresponding to the operated one of the hydraulic actuators ML, MR, MT, and C1 to C6.

As illustrated in FIG. 8, the controller U1 includes a relief controller Ub. The relief controller Ub changes the main relief pressure (relief set pressure) to a plurality of set values in accordance with the operation amount of the operation member 41. To be specific, the relief controller Ub increases the set value of the relief set pressure in a stepwise manner in accordance with the operation amount of the operation member 41.

Hereafter, referring to FIGS. 9 and 10, control of the relief set pressure performed by the relief controller Ub will be described in further detail.

As shown in FIG. 9, each mode has a plurality of set values. The plurality of set values include a first set value P_A, a second set value P_B, and a third set value P_C. The first set value P_A is a set value of the relief set pressure when the operation member 41 is not operated (all operation members 41 are not operated), and is 15.0 MPa. That is, the initial pressure of the main relief pressure is 15.0 MPa. In the present embodiment, the first set value P_A is 15.0 MPa in each of the hard mode, the normal mode, and the soft mode.

The second set value P_B is a set value in a range such that the operation amount of the operation member 41 does not exceed a predetermined amount. To be specific, the second set value P_B is a set value when the operation member 41 is operated in a range such that the operation member 41 does not move beyond a predetermined position (intermediate position) between the starting-end position (neutral position) and the terminal-end position (fully operated position) of the operation range of the operation members 41. The starting-end position is a position in which the operation member 41 is not operated (non-operated position), and the terminal end position is a position in which the operation member 41 is operated to the maximum. The second set value P_B of the hard mode is the highest, the second set value P_B of the normal mode is lower than that of the hard mode, and the second set value P_B of the soft mode is lower than that of the normal mode. To be specific, the second set value P_B of the hard mode is 24.5 MPa, the second set value P_B of the normal mode is 20.6 MPa, and the second set value P_B of the soft mode is 15.0 MPa.

The third set value P_C is a set value when the operation member 41 is operated more than predetermined amount. To be specific, the third set value P_C is a set value when the operation member 41 is operated in a range such that the operation member 41 moves beyond the predetermined position between the starting-end position and the terminal-end position of the operation members 41. The third set value P_C of the hard mode is the highest, the third set value P_C of the normal mode is lower than that of the hard mode, and the third set value P_C of the soft mode is lower than that of the normal mode. To be specific, the third set value P_C of the hard mode is 27.4 MPa, the third set value P_C of the normal mode is 24.5 MPa, and the third set value P_C of the soft mode is 15.0 MPa. In the present embodiment, in the soft mode, the first set value P_A, the second set value P_B, and the third set value P_C are each 15.0 MPa.

Next, referring to FIG. 10, change in the main relief pressure corresponding to an operation of the operation member 41 will be described. In the present embodiment, a threshold Ip is used to determine whether or not to change the main relief pressure to the third set value P_C. The threshold Ip is an electric-current value that is used to operate the direction switching valves DV1 to DV10, and is an electric-current value when the operation member 41 is in a predetermined position (intermediate position) between the starting-end position and the terminal end position. In the following description, as the threshold Ip, a threshold Ip1 that is a pilot pressure for operating the direction switching valves DV1 to DV10 and that is a pilot pressure corresponding to the threshold Ip will be used.

As illustrated in FIG. 10, when the mode is set to the hard mode or the normal mode, if the highest pilot pressure does not exceed the threshold Ip1 (the command electric-current value does not exceed the threshold Ip) within a predetermined time t1 after any of the operation members 41 is operated, the main relief pressure increases from the first set value P_A to the second set value P_B in proportion to the elapsed time.

If the highest pilot pressure exceeds the threshold Ip1 after the main relief pressure is changed from the first set value P_A to the second set value P_B, the main relief pressure switches from the second set value P_B to the third set value P_C. Subsequently, when the highest pilot pressure becomes lower than the threshold Ip1, the main relief pressure switches from the third set value P_C to the second set value P_B. Subsequently, if all of the operated operation members 41 are operated to the neutral positions, the main relief pressure switches from the second set value P_B to the first set value P_A.

Figure 11:
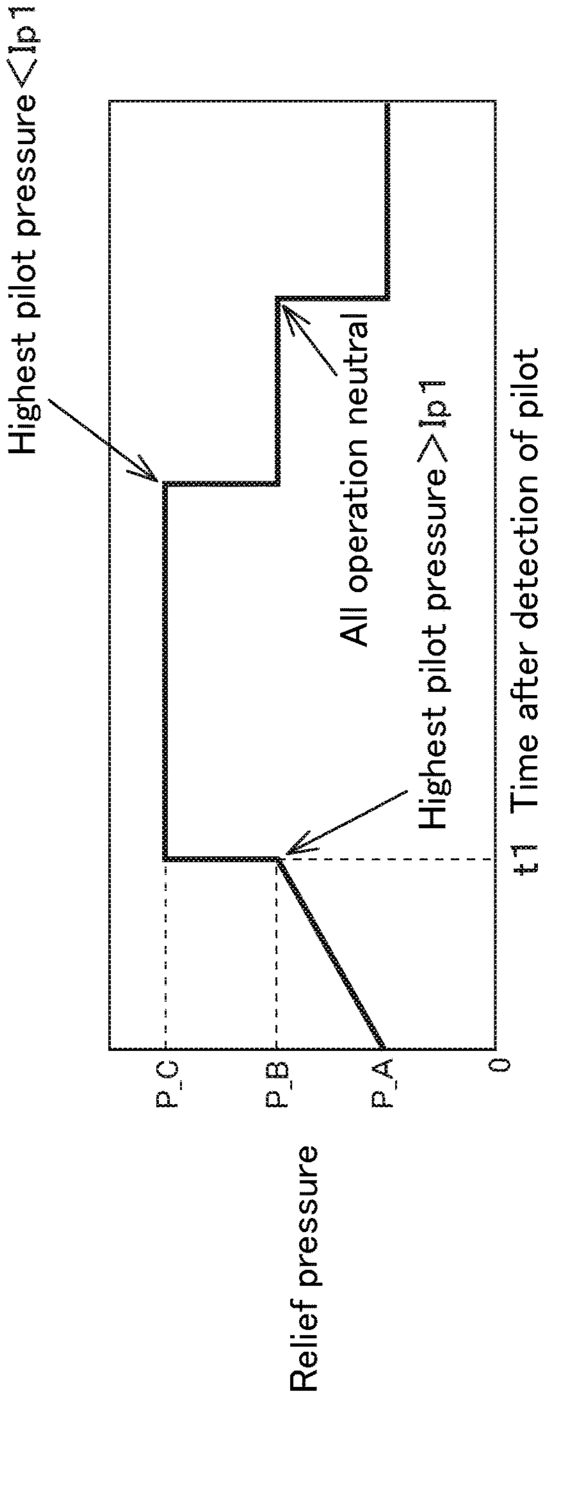
FIG. 11 is another graph illustrating change in the main relief pressure.

If the highest pilot pressure exceeds the threshold Ip1 (the command electric-current value exceeds the threshold Ip) within a predetermined time t1 after any of the operation members 41 is operated, as illustrated in FIG. 11, the main relief pressure switches to the third set value P_C in the midst of increasing from the first set value P_A to the second set value P_B.

By setting the second set value P_B and the third set value P_C to the same value and setting the threshold Ip1 to be higher than or equal to the highest pilot pressure applied to the direction switching valves DV1 to DV10, it is possible to delay setting of the highest main relief pressure for a certain time even if any pilot input is made to the direction switching valves DV1 to DV10.

As shown in FIG. 9, the predetermined time t1=0.5 sec in the hard mode, and the predetermined time t1=1 sec in the normal mode.

Switching from the second set value P_B to the third set value P_C, switching from the third set value P_C to the second set value P_B, and switching from the second set value P_B to the first set value P_A are each performed instantaneously, but may be performed over a period of time. The hard mode may be fixed at 27.4 MPa. That is, in the hard mode, the first set value P_A, the second set value P_B, and the third set value P_C may each be 27.4 MPa.

When the soft mode is selected, the first set value P_A, the second set value P_B, the third set value P_C are each 15.0 MPa.

By increasing the main relief pressure from 15.0 MPa, which is a low level, when the operation member 41 is sharply operated, for example, to raise or lower the boom 15, to swivel the machine body 2, or to drive the traveling device 3, start of movement is slowed (activation shock is reduced) and a shock when activating can be suppressed.

In the hard mode, because the third set value P_C of the main relief pressure is higher than that in the normal mode, when causing an operation target to perform an operation such that the main relief pressure becomes the highest pressure, the operation target can exhibit high performance. Conversely, in the normal mode, because the third set value P_C of the main relief pressure is lower than that in the hard mode, a load that is applied to members of the operation target and the like can be reduced, and the durability of the operation target can be improved.

In each of the hard mode and the normal mode, because the second set value P_B of the main relief pressure is lower than the third set value P_C, in an intermediate operation region of the operation range of the operation member 41, sensitivity that is peculiar to the load sensing system can be reduced, and shock due to actuation of the operation target is alleviated even if the operation member 41 is sharply operated.

The working machine 1 may be used to perform ground-leveling work. Ground-leveling work may be performed, for example, by using the working tool 17 while swinging the boom 15 and the arm 16, by using the working tool 17 while swiveling the machine body 2, by using the traveling device 3 while moving the working machine 1 forward and backward, or by using the dozer 7 while moving the working machine 1 forward.

In the soft mode, because the main relief pressure is lower than that in the hard mode and the normal mode, it is easy to level the ground in ground-leveling work by selecting the soft mode. That is, because the load sensing system performs flow-rate control, with existing technologies (in which the main relief pressure is fixed to a high pressure), even when the operation members 41 is slightly operated, the operation target moves sensitively. With the present embodiment, it is possible to reduce the sensitivity that is peculiar to the load sensing system by selecting the soft mode, and thus it is easy to perform ground leveling work. Moreover, it is easy to perform ground-leveling work because an unnecessarily large force is not generated. Moreover, it is possible to reduce the probability of occurrence of a trouble in the movement of the operation target.

In the embodiment described above, the operation of the operation member 41 is detected by the sensor 42, and the operation target is actuated by electrically controlling the direction switching valves DV1 to DV10 based on the detected information. Alternatively, the operation member 41 may include a pilot valve, and the direction switching valves DV1 to DV10 may include pilot-operation switching valves that are operated by a pilot pressure output from the operation member 41. A pilot valve is a control valve that outputs a pilot pressure corresponding to an operation amount and operates another valve by using the output pilot pressure. A pilot-operation switching valve is a switching valve that is directly operated by a pilot pressure from a pilot valve.

In the case where the operation member 41 includes a pilot valve and the direction switching valves DV1 to DV10 include pilot-operation switching valves, the main relief pressure is as follows.

In the case where the direction switching valves DV1 to DV10 include pilot-operation switching valves, detection of an operation on the operation member 41 is performed by the AI switch 29.

As shown in FIG. 12, the first set value P_A is 15.0 MPa. If the AI switch 29 detects that any one or more of the operation members 41 is operated, the main relief pressure is changed from the first set value P_A to the second set value P_B after a predetermined time t1. Also in this case, as illustrated in FIG. 10, the main relief pressure increases from the first set value P_A to the second set value P_B in proportion to the elapsed time. The predetermined time t1 is 0.5 sec in each of the hard mode, the normal mode, and the soft mode. In the hard mode, the second set value P_B=the third set value P_C=27.4 MPa. In the normal mode, the second set value P_B=20.6 MPa and the third set value P_C=24.5 MPa. In the soft mode, the second set value P_B=the third set value P_C=24.5 MPa.

In the normal mode, when changing the main relief pressure from the second set value P_B to the third set value P_C, for example, it is possible to enable the controller U1 to recognize the operation amount of the operation member 41 by detecting a pressure output from the operation member (pilot valve) 41. That is, when it is detected that the operation member 41 is operated in an intermediate region of the operation range, the main relief pressure is maintained at the second set value P_B. When it is detected that the operation members 41 is operated to the terminal end position (fully operated position) of the operation range, the main relief pressure is changed to the third set value P_C.

Also in the normal mode, the second set value P_B may be equal to the third set value P_C. In the case where the direction switching valves DV1 to DV10 include pilot-operation switching valves, detection of an operation on the operation member (pilot valve) 41 may be performed by using a pilot pressure that is output from the operation member 41.

Some of the direction switching valves DV1 to DV10 installed in the working machine 1 may include pilot solenoid valves, and some others of the direction switching valves DV1 to DV10 may include pilot-operation switching valves. For example, the direction switching valves DV1, DV2, DV7, and DV8 for operating the machine body 2 and the working device 4 may include pilot solenoid valves, and the direction switching valves DV3 to DV6, DV9, and DV10 for operating the other operation targets may include pilot-operation switching valves. In the case where some of the direction switching valves DV1 to DV10 include pilot solenoid valves and some others of the direction switching valves DV1 to DV10 include pilot-operation switching valves, when operating both of the pilot solenoid valves and the pilot-operation switching valves, the set values shown in FIG. 12 are prioritized as the main relief pressure.

In the case where some of the direction switching valves DV1 to DV10 include pilot solenoid valves and some others of the direction switching valves DV1 to DV10 include pilot-operation switching valves, for example, in a case where the direction switching valves DV1, DV2, DV7, and DV8 for operating the machine body 2 and the working device 4 include pilot solenoid valves and the direction switching valve DV4 and DV5 for operating the traveling device 3 include pilot-operation switching valves and the soft mode is selected, it is possible to prevent an unnecessary force from being generated when performing ground-leveling work by operating the machine body 2 and the working device 4, and it is possible to enable a necessary force to be generated when the working machine 1 travels.

As illustrated in FIG. 8, the working machine 1 includes a fluid temperature sensor 44 for detecting the fluid temperature of a hydraulic fluid. The fluid temperature sensor 44 is, for example, a sensor for detecting the fluid temperature of a hydraulic fluid on the suction side of the first pump 21 (for example, a hydraulic fluid in the hydraulic fluid tank T2). The fluid temperature sensor 44 is connected to the controller U1. The controller U1 can obtain detection information of the fluid temperature sensor 44. The controller U1 includes an automatic switcher Uc that automatically switches the mode in accordance with the fluid temperature of a hydraulic fluid. The automatic switcher Uc automatically switches the mode to the hard mode if it is determined that the fluid temperature is a low temperature that is lower than or equal to a first predetermined temperature (for example, lower than or equal to −10° C.) irrespective of selection of the current mode, that is, irrespective of whether the normal mode or the soft mode is selected as the current mode. Subsequently, if it is determined that the fluid temperature is a normal temperature that is higher than or equal to a second predetermined temperature (for example, higher than or equal to 0° C.), the automatic switcher Uc automatically returns the mode to the originally selected mode.

Under a low temperature condition, due to the pressure loss or the like of a hydraulic fluid that flows through a hydraulic hose, the pressure of a hydraulic fluid required for actuation of the hydraulic actuators ML, MR, MT, and C1 to C6 increases, and the speed may decrease if the main relief pressure is low. Therefore, the speed of the operation target decreases when the normal mode or the soft mode is continued to be selected. In such a case, by automatically switching to the hard mode, it is possible to avoid decrease of the speed after activation under a low temperature condition, even if an operator does not manually switch the mode to the hard mode.

The working machine 1 includes: the operation member 41, the hydraulic actuators ML, MR, MT, and C1 to C6 that are actuated in accordance with the operation amount of the operation member 41; a pump (the first pump 21) that delivers a hydraulic fluid for actuating the hydraulic actuators ML, MR, MT, and C1 to C6; the variable relief valves V12 and V15 that variably regulate the pressure of a hydraulic fluid delivered from the pump 21; and the relief controller Ub that controls the relief set pressure that is a pressure regulated by the variable relief valves V12 and V15. The relief controller Ub changes the relief set pressure in accordance with the operation amount of the operation member 41.

With this configuration, it is possible to control the relief set pressure to be low when the operation member 41 is not operated. Thus, because the relief set pressure increases from a low level when the operation member 41 is sharply operated, the activation shock of the hydraulic actuators ML, MR, MT, and C1 to C6 can be suppressed.

The relief controller Ub sets the relief set pressure to one of a plurality of set values, and increases the set value of the relief set pressure in a stepwise manner in accordance with an increase of the operation amount of the operation member 41.

Also with this configuration, it is possible to control the relief set pressure to be low when the operation member 41 is not operated, and the activation shock of the hydraulic actuators ML, MR, MT, and C1 to C6 can be suppressed.

The relief controller Ub regulates the relief set pressure to the first set value P_A when the operation member 41 is not operated, changes the relief set pressure to the second set value P_B higher than the first set value P_A at a predetermined time t1 after the operation member 41 is operated, and changes the relief set pressure to the third set value P_C higher than the second set value P_B when the operation amount of the operation member 41 exceeds a predetermined amount.

With this configuration, it is possible to set forces necessary for various works in accordance with the operation amount of the operation member 41.

The relief controller Ub changes the relief set pressure to the third set value P_C when the operation amount of the operation member 41 exceeds a predetermined amount within a predetermined time t1 after the operation member 41 is operated.

With this configuration, it is possible to improve responsivity.

The working machine 1 has a plurality of modes having different set values of the relief set pressure, and the plurality of modes differ from each other in the set values of the highest pressure of the relief set pressure.

With this configuration, it is possible to perform work with a force suitable for the type of the work by switching the mode in accordance with the type of the work.

The plurality of modes include a first mode whose set value of the highest pressure of the relief set pressure is the highest, a second mode whose set value of the highest pressure of the relief set pressure is lower than that of the first mode, and a third mode whose set value of the highest pressure of the relief set pressure is lower than that of the second mode. The relief set pressures of the first mode, the second mode, and the third mode when the operation member 41 is not operated are the same set value. Also with this configuration, it is possible to perform work with a force suitable for the type of the work.

The working machine 1 includes: the fluid temperature sensor 44 that detects the fluid temperature of a hydraulic fluid; and the automatic switcher Uc that switches the mode to one of the plurality of modes whose set value of the highest pressure of the relief set pressure is the highest when the fluid temperature is lower than a first predetermined temperature and that returns the mode to the original mode when the fluid temperature becomes a second predetermined temperature higher than the first predetermined temperature.

With this configuration, it is possible to automatically avoid decrease of speed after activation under a low-temperature condition even if an operator does not manually switch the mode.

The working machine 1 includes a plurality of the hydraulic actuators ML, MR, MT, and C1 to C6, the pump 21 is a variable displacement pump, and the working machine 1 includes a load sensing system that controls the pump 21 so that the pressure difference between the delivery pressure of the pump 21 and the highest load pressure of the plurality of hydraulic actuators ML, MR, MT, and C1 to C6 is a constant pressure.

Figure 5:
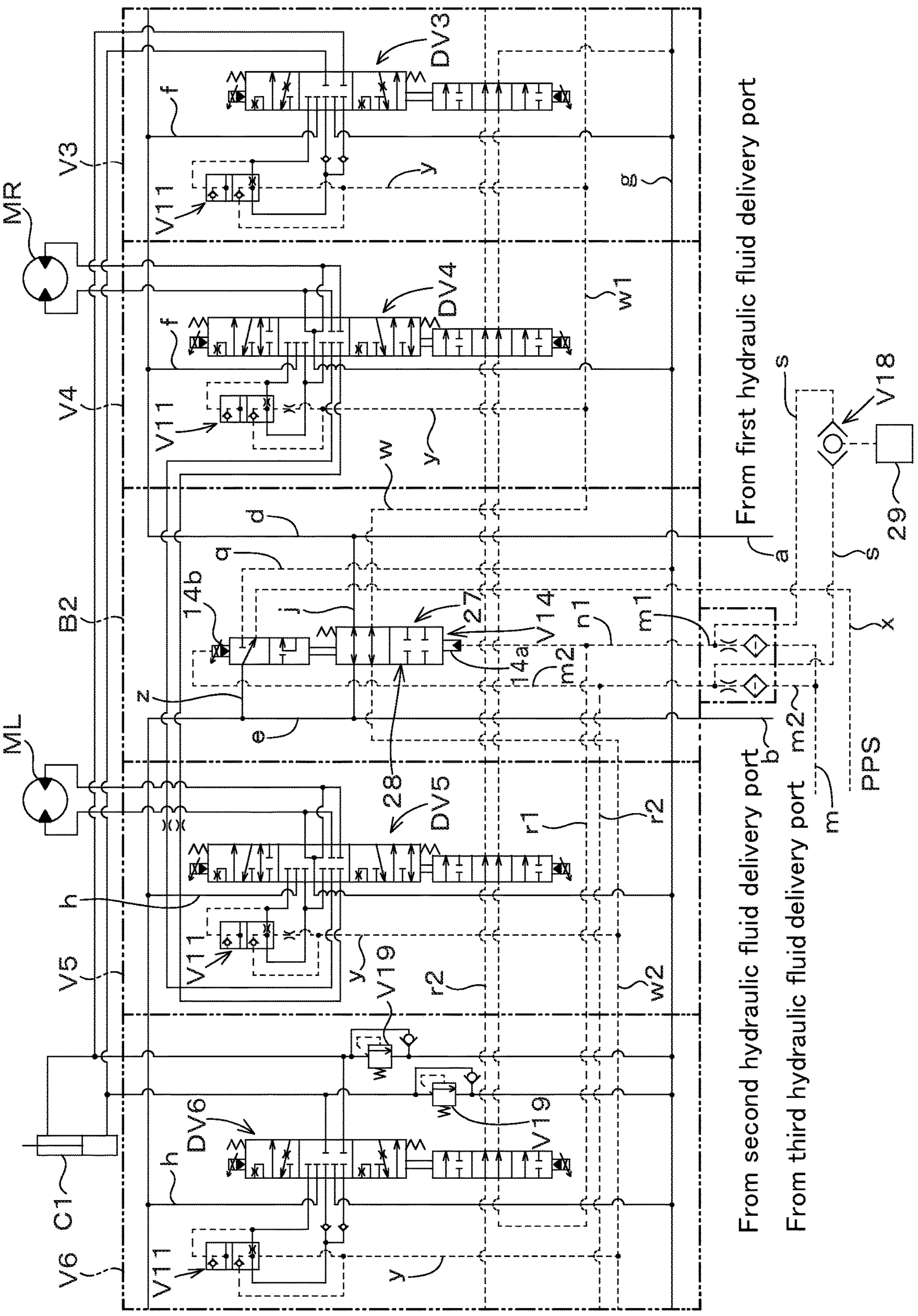
FIG. 5 is a circuit diagram of a part of a control valve.
Figure 6:
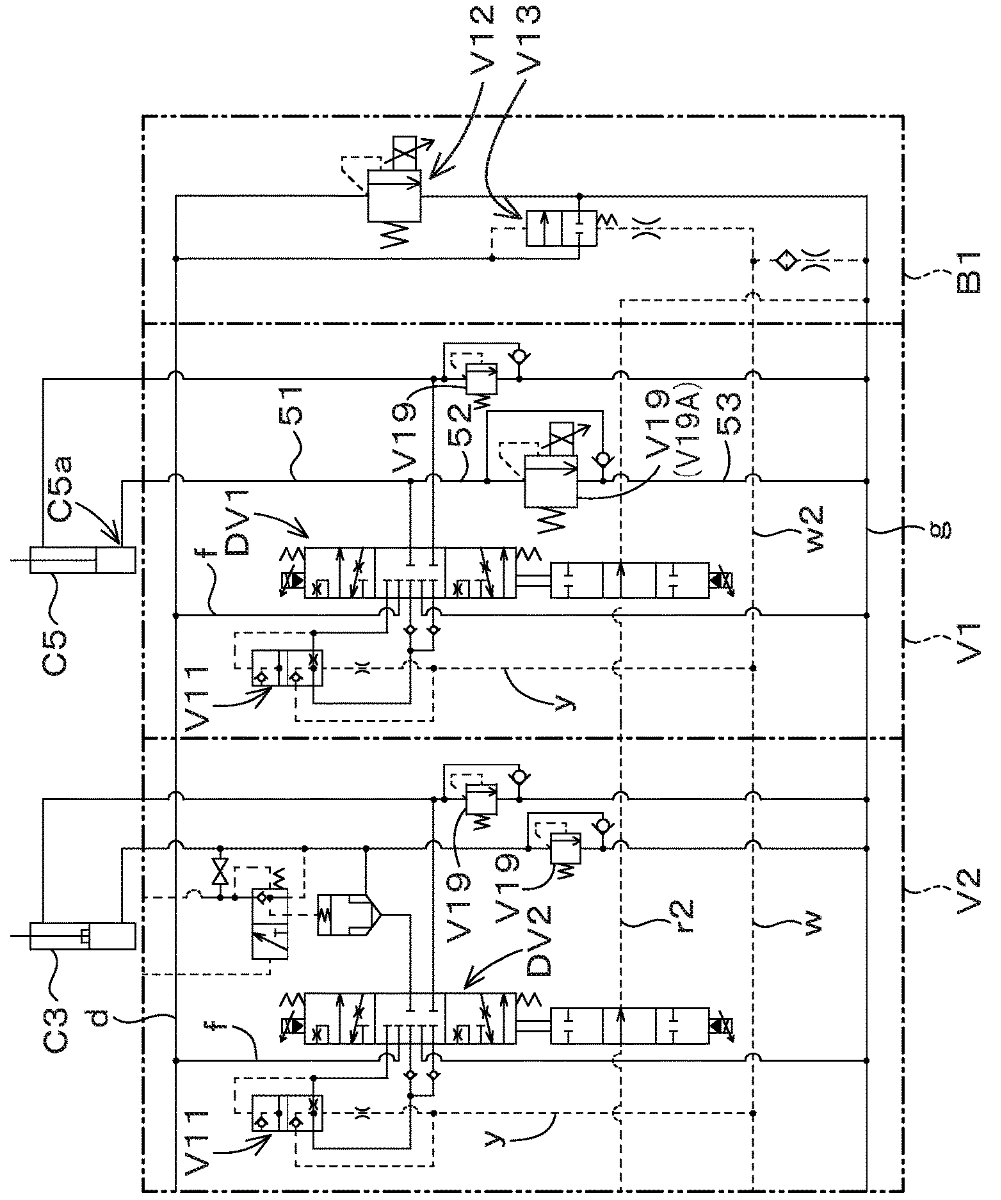
FIG. 6 is a circuit diagram of another part of the control valve.
Figure 7:
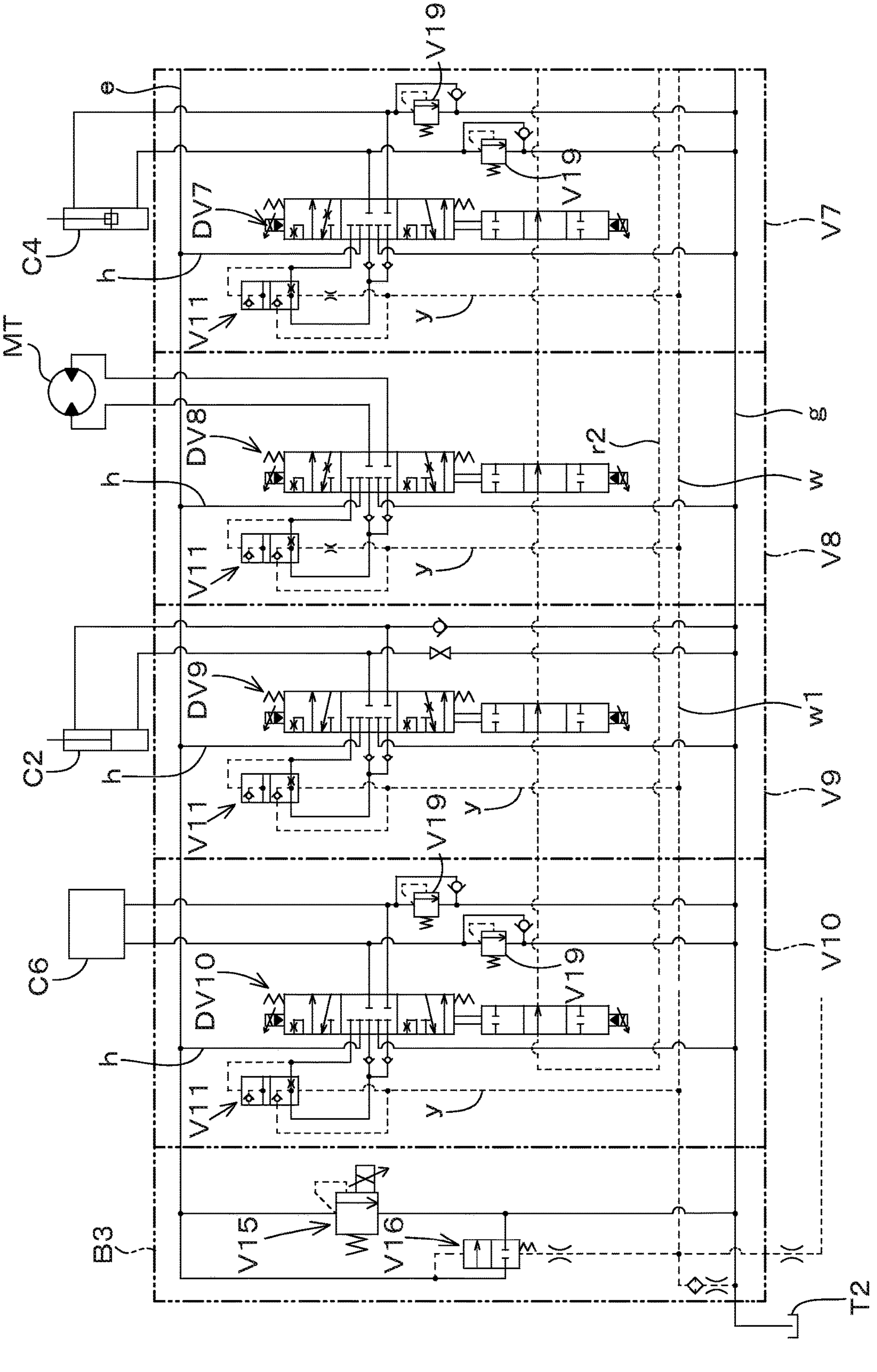
FIG. 7 is a circuit diagram of still another part of the control valve.

As illustrated in FIGS. 5, 6, and 7, in order to prevent overload applied to the hydraulic actuators C1 and C3 to C6, the control valves V1, V2, V6, V7, and V10 each include an overload relief valve (port relief valve) V19 that regulates the highest pressure (relief set pressure) applied to the hydraulic actuators C1 and C3 to C6.

As illustrated in FIG. 6, the overload relief valve V19, which communicates with a bottom-side (crowd-side) port C5*a* of the working tool cylinder C5 (working-tool driving actuator), includes a variable overload relief valve V19A of a solenoid type whose relief set pressure is variable.

The variable overload relief valve V19A is connected via a first connection fluid passage 52 to a supply-discharge fluid passage 51 that connects the working-tool control valve V1 (actuator control valve) and the crowd-side port C5*a* of the working tool cylinder C5. The variable overload relief valve V19A is connected to the drain fluid passage g via a second connection fluid passage 53.

As illustrated in FIG. 8, a solenoid V19*a* of the variable overload relief valve V19A is connected to the controller U1. That is, the controller U1 can control the variable overload relief valve V19A.

As illustrated in FIG. 8, the controller U1 includes a swivel detector Ud. The swivel detector Ud detects that the swivel control valve V8 (direction switching valve DV8) is being operated, that is, the machine body 2 is being swiveled. To be specific, the swivel detector Ud performs detection when the first operation actuator 41A is operated in a direction for operating the swivel motor MT and the controller U1 receives an operation signal transmitted from the first operation actuator 41A. Swiveling of the machine body 2 may be detected by a rotation sensor that detects the rotation of the machine body 2 or the rotation of the swivel motor MT. In this case, it is possible to enable the controller U1 (the swivel detector Ud) to recognize swiveling of the machine body 2 by connecting the rotation sensor to the controller U1. When the swivel control valve V8 of the direction switching valve DV8 includes a pilot-operation switching valve, swiveling of the machine body 2 may be detected by detecting a pilot pressure applied to the pilot-operation switching valve.

As illustrated in FIG. 8, a motion sensor (working-tool motion detector) 45 is connected the controller U1. The motion sensor 45 detects whether or not the working tool 17 is moving. The motion sensor 45 includes a potentiometer that directly detects swing of the working tool 17, a stroke sensor that detects extension and contraction of the working tool cylinder C5, and the like.

The controller U1 includes a working motion detector Ue. The working motion detector Ue detects a relief state (high-load work state) in which the main relief valve V12 (V15) is relieved due to the working tool 17 when the motion sensor 45 detects that the working tool 17 is being operated by the second operation actuator 41B (the operation members 41) and the working tool 17 is not moving. An example of the high-load work state is a state in which, in a case where the working tool 17 is a bucket, the working tool 17 is operated in the crowd direction and the working tool 17 remains stationary while grappling an object (rock or the like). At this time, the main relief pressure is controlled to, for example, 24.5 MPa.

As illustrated in FIG. 8, the controller U1 includes an overload controller Ug. The overload controller Ug reduces the relief set pressure of the variable overload relief valve V19A when the main relief valve V12 (V15) is in a relief state and the machine body 2 swivels. For example, when the highest pressure of the crowd-side port C5*a* of the working tool cylinder C5, which is regulated by the variable overload relief valve V19A, is 29.4 MPa, the overload controller Ug reduces the relief set pressure to 20.6 MPa, which is lower than the main relief pressure. This value is an example and is not limited.

With existing technologies, when the machine body 2 is swiveled while the working tool cylinder C5 is relieved, the working tool cylinder C5 is actuated by a relief pressure and the swivel motor MT is moved by a low pressure. Then, in the load sensing system, in order to appropriately distribute the flow of a hydraulic fluid, a dummy load is generated by using the pressure compensation valve V11 of the swivel control valve V8, which is on the low-pressure side, to balance the loads between the hydraulic actuators. That is, the loads are balanced by generating the dummy load in a low-load section to correspond to the load in a high-load section. Then, a pressure loss occurs in the section where the dummy load is generated and the temperature of a hydraulic fluid is increased, and the fluid temperature of a hydraulic fluid that flows to the section on the swivel side increases. As a result, a component (sealing member) of the swivel motor MT may deteriorate.

In such a case, that is, in a case where the machine body 2 swivels while the variable overload relief valve V19A is in a relief state, by reducing the relief set pressure of the variable overload relief valve V19A, the dummy load generated by the pressure compensation valve V11 of the swivel control valve V8 (dummy pressure loss) is reduced. Thus, increase in the fluid temperature of a hydraulic fluid due to the dummy load can be suppressed. That is, increase in the fluid temperature of a hydraulic fluid that flows to the swivel motor MT can be suppressed. Moreover, energy can be saved.

In the present embodiment, a case where the working tool 17 is a bucket has been described as an example. However, the working tool 17 may be a working tool other than the bucket. For example, the working tool 17 may be a grapple. In a case where the working tool 17 is a grapple, the variable overload relief valve V19A is used as the overload relief valve V19 of the SP control valve V10. That is, the hydraulic actuator (working-tool driving actuator) C6 for causing a grappling tool, which is installed in the grapple to perform a grappling movement and a releasing movement, is operated by the SP control valve V10. Accordingly, among the two overload relief valves V19 of the SP control valve V10, the variable overload relief valve V19A is used as the overload relief valve V19 connected to the grapple-side port of the hydraulic actuator C6. That is, in the case where the working tool 17 is a grapple, when the machine body 2 swivels while the grapple is grappling an object such a wood, the relief set pressure of the variable overload relief valve V19A, which is connected to the grapple-side port of hydraulic actuator C6, is reduced.

In the present embodiment, when the motion sensor 45 detects that the second operation actuator 41B is operating the working tool 17 and the working tool 17 is not moving, the relief set pressure of the variable overload relief valve V19A is reduced. Therefore, even when the main relief valve V12 (V15) is in a relief state, if the working tool 17 is moving, the relief set pressure of the variable overload relief valve V19A is not reduced. For example, examples of excavation include a swivel side-pressing excavation in which the machine body 2 is swiveled to perform excavation while swinging the working tool 17 and pressing the working tool 17 against a wall or the like. When performing this work, if the relief set pressure of the variable overload relief valve V19A is reduced, a force of the working tool 17 decreases and the excavation power decreases. Accordingly, when performing the swivel side-pressing excavation, the relief set pressure of the variable overload relief valve V19A is not reduced so that the power of the working tool 17 may not be reduced.

As illustrated in FIG. 8, the controller U1 includes a stroke limiter Uh.

The stroke limiter Uh limits the stroke of a spool V1_a_ of the working-tool control valve V1 to a predetermined amount when the overload controller Ug reduces the relief set pressure of the variable overload relief valve V19A. In a case of the SP control valve V10, a spool V10_a_ is limited to a predetermined amount. Thus, it is possible to save energy by reducing the flow rate of a hydraulic fluid that is uselessly drained.

That is, when the working tool 17 or the like is grappling an object, the operation member 41 is fully operated, and the entire amount of a hydraulic fluid that flows from the working-tool control valve V1 toward the port C5_a_ is uselessly drained from the variable overload relief valve V19A. That is, when the working tool 17 or the like is grappling an object (the variable overload relief valve V19A is in a relief state), because the flow rate of a hydraulic fluid remains high although the power of the working tool 17 is reduced by reducing the relief set pressure of the variable overload relief valve V19A, the spool V10_a_ is returned by a predetermined amount to reduce excessive flow rate of the hydraulic fluid and to save energy.

In the present embodiment, because the working-tool control valve V1 (direction switching valve DV1) controls the stroke of the spool V10_a_ by using a pilot pressure, it is easy to limit the stroke by limiting the stroke of the spool V10_a_ by using the pilot pressure. That is, the stroke limiter Uh has a threshold, and, when a pilot pressure applied to the working-tool control valve V1 (the solenoid of the direction switching valve DV1) is higher than the threshold, the stroke limiter Uh limits the stroke of the spool V10_a_ by reducing the pilot pressure to the threshold. The same applies to the SP control valve V10.

The working machine 1 includes the machine body 2, the swivel motor MT that swivels the machine body 2, the working tool 17 installed on the machine body 2, the working-tool driving actuators (the working tool cylinder C5, hydraulic actuator C6) that drive the working tool 17, the hydraulic circuit that supplies a hydraulic fluid to and discharges the hydraulic fluid from the swivel motor MT and the working tool actuators C5 and C6, the main relief valve V12 (V15) that relieves the hydraulic fluid when the pressure of a hydraulic fluid in the hydraulic circuit becomes higher than or equal to a set pressure, the variable overload relief valve V19A that relieves a hydraulic fluid in the working-tool driving actuators C5 and C6 when the pressure of the hydraulic fluid becomes higher than or equal to a predetermined pressure, and the overload controller Ug that controls the variable overload relief valve V19A. The overload controller Ug reduces the relief set pressure of the variable overload relief valve V19A when the machine body 2 swivels in a relief state in which the main relief valve V12 (V15) is relieved.

With this configuration, when the machine body 2 swivels in the state in which the main relief valve V12 (V15) is relieved, it is possible to suppress an increase in the temperature of a hydraulic fluid that flows toward the swivel side by reducing the relief set pressure of the variable overload relief valve V19A.

The working machine 1 includes an operation detector (the second sensor 42B) that detects a motion of an operation member (the second operation actuator 41B) that operates the working tool 17, and a working-tool motion detector (the motion sensor 45) that detects a motion of the working tool 17. When the working tool 17 is operated by using the operation member and the machine body 2 swivels in a state in which the working tool 17 is not moving, the overload controller Ug reduces the relief set pressure of the variable overload relief valve V19A. Even when the machine body swivels, when the working tool 17 is not operated by using the operation member and when the working tool 17 is moving, the overload controller Ug does not reduce the relief set pressure of the variable overload relief valve V19A.

With this configuration, it is possible to prevent decrease of the efficiency of work performed by using the working tool 17, because the relief set pressure of the variable overload relief valve V19A is not reduced when the working tool 17 is moving.

The working machine 1 includes: the actuator control valves (the working-tool control valve V1, the SP control valve V10) that control the working-tool driving actuators C5 and C6; and the stroke limiter Uh that limits the strokes of the spools V1_a_ and V10_a_ of the actuator control valves V1 and V10 to predetermined amounts when the overload controller Ug reduces the relief set pressure of the variable overload relief valve V19A.

With this configuration, it is possible to save energy by reducing the amount of a hydraulic fluid that is uselessly drained.

The actuator control valves V1 and V10 are operated by a pilot pressure, and, when a pilot pressure applied to the actuator control valves V1 and V10 is higher than a threshold, the stroke limiter Uh limits the stroke by reducing the pilot pressure to the threshold.

With this configuration, it is possible to easily configure the stroke limiter Uh.

The working machine 1 includes: the plurality of hydraulic actuators ML, MR, MT, and C1 to C6 including the swivel motor MT that swivels the machine body 2 and the working-tool driving actuators C5 and C6; the hydraulic fluid pump 21 that delivers a hydraulic fluid supplied to the plurality of hydraulic actuators ML, MR, MT, and C1 to C6; and a load sensing system that controls the pump 21 so that the pressure difference between the delivery pressure of the pump 21 and the highest load pressure of the plurality of hydraulic actuators ML, MR, MT, and C1 to C6 becomes a constant pressure.

Figure 13:
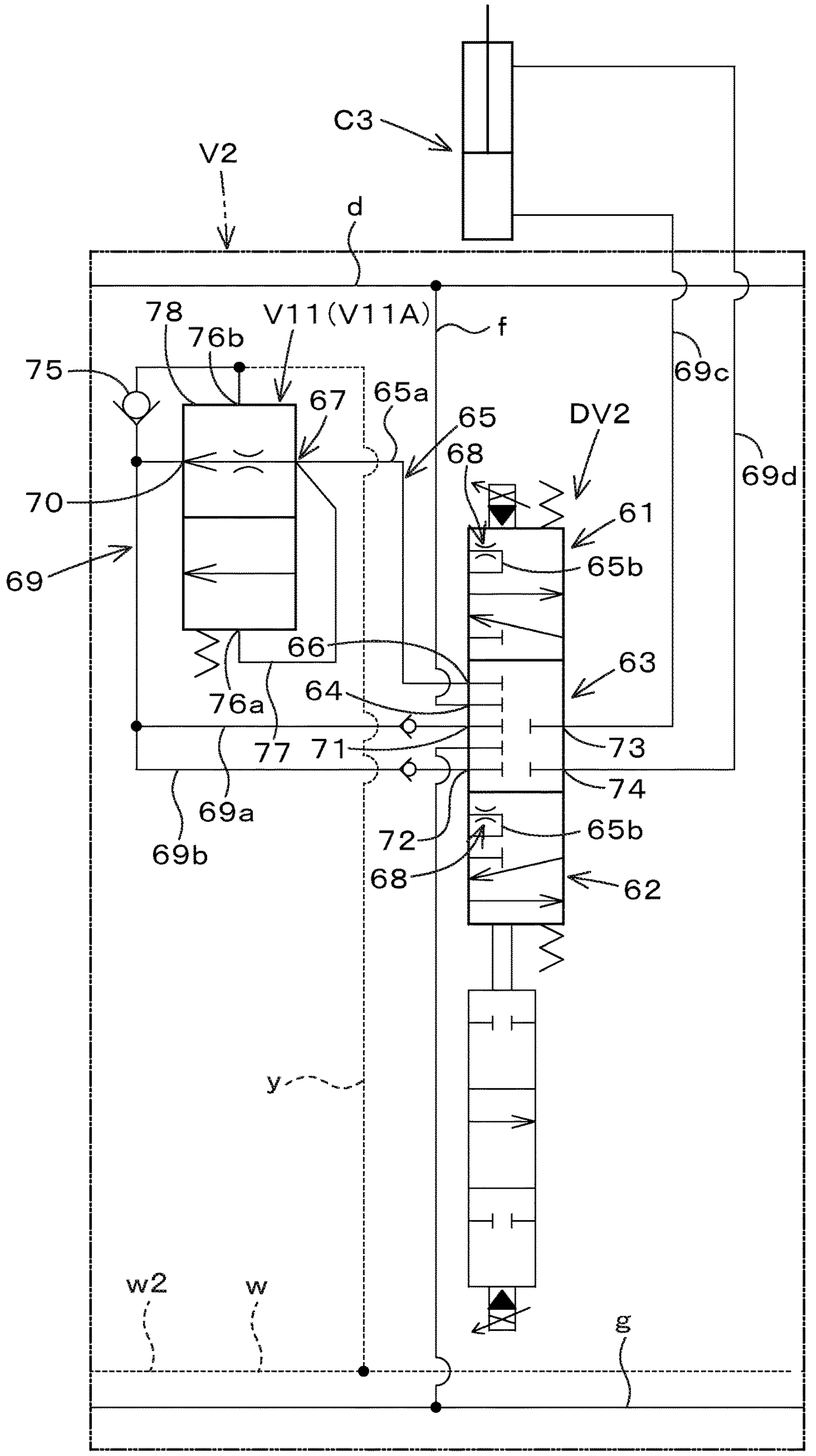
FIG. 13 is a detailed circuit diagram of a control valve including a pressure compensation valve
Figure 14:
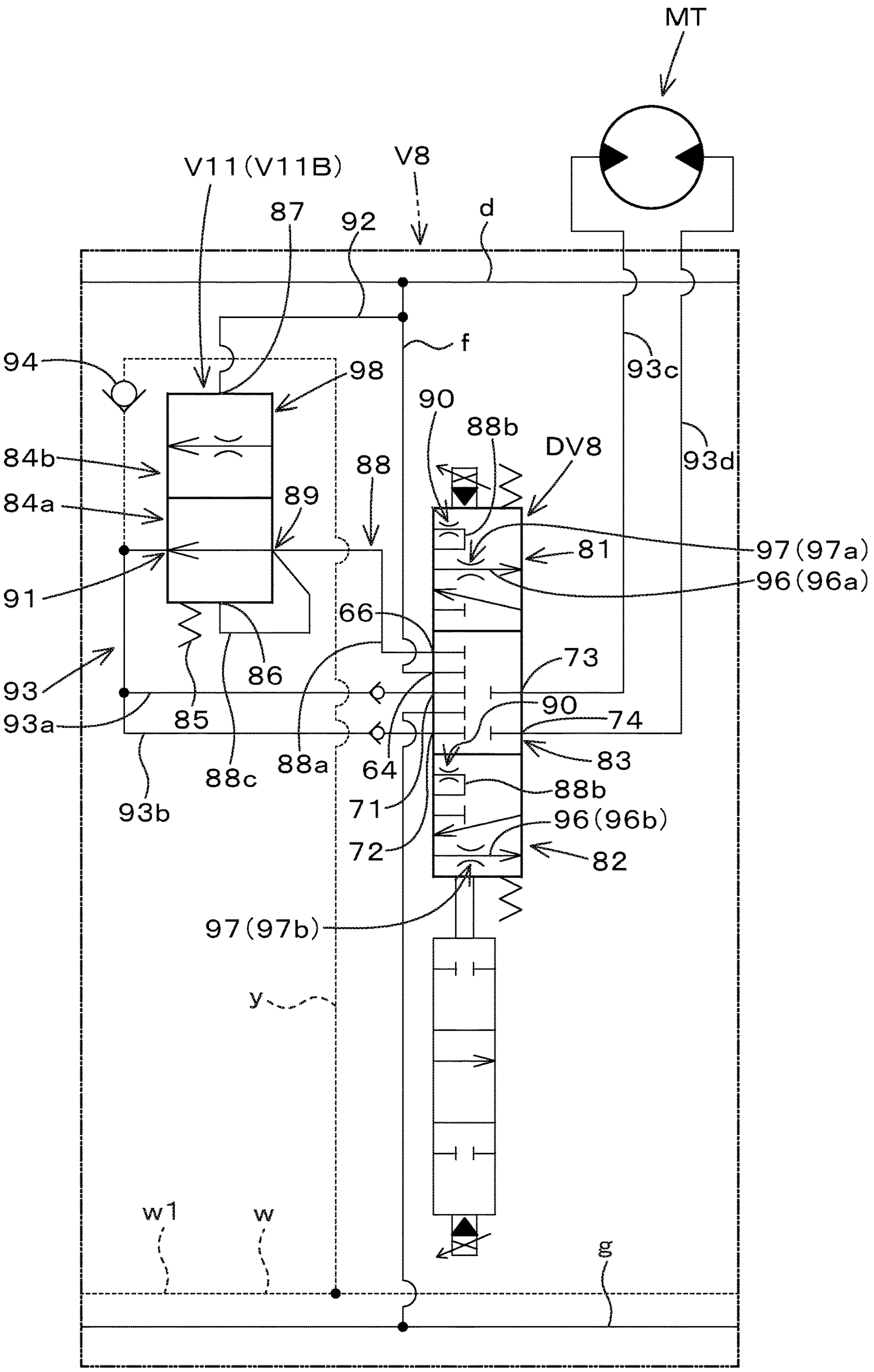
FIG. 14 is a detailed circuit diagram of a control valve including a flow-rate prioritizing valve.

FIGS. 13 and 14 illustrate another embodiment. FIG. 13 illustrates a boom control valve (first control valve) V2. FIG. 14 illustrates a swivel control valve (second control valve) V8. Hereafter, referring to FIGS. 13 and 14, the other embodiment will be described.

As described above, the load sensing system changes the angle of the swash plate of the first pump 21 to adjust the delivery flow rate of the first pump 21 so that the pressure difference between the PPS signal pressure and the PLS signal pressure (PPS signal pressure–PLS signal pressure: first pressure difference) becomes a predetermined pressure (so that the first pressure difference becomes constant).

As illustrated in FIG. 13, the boom control valve V2 includes the direction switching valve DV2 and the pressure compensation valve V11 (V11A). The direction switching valve DV2 can switch the direction of a hydraulic fluid that flows toward the boom cylinder (high-load hydraulic actuator) C3. The direction switching valve DV2 is, for example, a three-way valve that switches between a first position 61, a second position 62, and a third position (neutral position) 63.

When the direction switching valve DV2 is in the first position 61, the direction switching valve DV2 switches to a direction such that a hydraulic fluid flows to the bottom side of the boom cylinder C3, and switches to a direction such that a hydraulic fluid returned from the rod side of the boom cylinder C3 (returned fluid) is discharged to the drain fluid passage g (the hydraulic fluid tank T2). When the direction switching valve DV2 is in the second position 62, the direction switching valve DV2 switches to a direction such that a hydraulic fluid (returned fluid) returned from the bottom side of the boom cylinder C3 is discharged to the drain fluid passage g (the hydraulic fluid tank T2), and switches to a direction such that a hydraulic fluid flows to the rod side of the boom cylinder C3. When the direction switching valve DV2 is in the third position 63, the direction switching valve DV2 does not supply a hydraulic fluid to the boom cylinder C3.

A pump port 64 of the direction switching valve DV2 is connected to the hydraulic-fluid branch passage f that branches off from the first hydraulic-fluid supply passage d. Through the hydraulic-fluid branch passage f, a hydraulic fluid output from the first pump 21 is supplied to the direction switching valve DV2. The direction switching valve DV2 and the pressure compensation valve V11A are connected by a connection fluid passage 65. The connection fluid passage 65 includes a first connection fluid passage 65*a* and a second connection fluid passage 65*b*. The first connection fluid passage 65*a* connects a first delivery port 66 of the direction switching valve DV2 and an inlet port 67 of the pressure compensation valve V11A. The second connection fluid passage 65*b* connects the pump port 64 of the direction switching valve DV2 and the first delivery port 66 of the direction switching valve DV2. The second connection fluid passage 65*b* is formed in the direction switching valve DV2. A throttle (flow passage throttle) 68 is provided in the second connection fluid passage 65*b*.

The pressure compensation valve V11A and the boom cylinder C3 are connected by a connection fluid passage 69. The connection fluid passage 69 includes a first connection fluid passage 69*a*, a second connection fluid passage 69*b*, a third connection fluid passage 69*c*, and a fourth connection fluid passage 69*d*. The first connection fluid passage 69*a* connects a delivery port 70 of the pressure compensation valve V11A and a first input port 71 of the direction switching valve DV2. The second connection fluid passage 69*b* connects the delivery port 70 of the pressure compensation valve V11A and a second input port 72 of the direction switching valve DV2. The third connection fluid passage 69*c* connects a second delivery port 73 of the direction switching valve DV2 and the bottom-side port of the boom cylinder C3. The fourth connection fluid passage 69*d* connects a third delivery port 74 of the direction switching valve DV2 and the rod-side port of the boom cylinder C3. The delivery port 70 of the pressure compensation valve V11A and the load transmission line y are connected via a check valve 75.

The pressure compensation valve V11A sets, to a predetermined range (predetermined value), the pressure difference between the pressure of a hydraulic fluid introduced into the pressure compensation valve V11A and the pressure of a hydraulic fluid output from the pressure compensation valve V11A. In other words, irrespective of the magnitudes of loads that are applied to hydraulic actuators during an operation in combination, the pressure compensation valve V11A distributes a hydraulic fluid into amounts corresponding to operation amounts by keeping the pressure difference across the spool of the direction switching valve DV2 (the pressure difference between the pressure of a hydraulic fluid on the upstream side and the pressure of a hydraulic fluid on the downstream side of the spool) constant. To be specific, the pressure compensation valve V11A includes a pressure receiver 76*a* that receives the pressure of a hydraulic fluid introduced into the inlet port 67, and a pressure receiver 76*b* that receives the pressure of a hydraulic fluid output from the delivery port 70. The inlet port 67 and the pressure receiver 76*a* are connected by a connection fluid passage 77. The delivery port 70 and the pressure receiver 76*b* are connected by a connection fluid passage 78.

Accordingly, the pressure of a hydraulic fluid output from the direction switching valve DV2 toward the pressure compensation valve V11A is applied to the pressure receiver 76*a*, and the pressure of a hydraulic fluid output from the delivery port 70 of the pressure compensation valve V11A is applied to the pressure receiver 76*b*. Then, a spool 98 of the pressure compensation valve V11A moves in accordance with the pressure difference between the hydraulic fluids, and the opening area of the pressure compensation valve V11A changes.

The configuration of the pressure compensation valve V11A of the boom control valve V2 and the connection structure of the pressure compensation valve V11A and the direction switching valve DV2 also apply to the working-tool control valve V1, the first dozer-control valve V3, the second traveling-control valve V4, the first traveling-control valve V5, the second dozer-control valve V6, the arm control valve V7, the swing control valve V9, and the SP control valve V10.

As described above, the hydraulic system controls the delivery flow rate of the first pump 21 in accordance with the highest load pressure when the hydraulic actuators ML, MR, MT, and C1 to C6 are actuated, and compensates the pressure of a hydraulic fluid supplied to the hydraulic actuators ML, MR, MT, and C1 to C6 by using the pressure compensation valve V11.

However, depending on the control valve, it is necessary to prioritize the flow rate of a hydraulic fluid supplied to the hydraulic actuators ML, MR, MT, and C1 to C6.

In the other embodiment, the working-tool control valve V1, the boom control valve V2, the first dozer-control valve V3, the second traveling-control valve V4, the first traveling-control valve V5, the second dozer-control valve V6, the arm control valve V7, the swing control valve V9, and the SP control valve V10 are control valves that can compensate the pressure of a hydraulic fluid; and the swivel control valve V8 is a control valve that can prioritize the flow rate of a hydraulic fluid.

As illustrated in FIG. 14, the swivel control valve V8 includes the direction switching valve (the low-load direction switching valve) DV8 and a flow-rate prioritizing valve V11B. The direction switching valve DV8 can switch the direction of a hydraulic fluid that flows toward the swivel motor (low-load hydraulic actuator) MT. The direction switching valve DV8 is, for example, a three-way valve that switches between a first position 81, a second position 82, and a third position (neutral position) 83. When the direction switching valve DV8 is in the first position 81, the direction switching valve DV8 switches to a direction such that a hydraulic fluid flows to one side of the swivel motor MT, and switches to a direction such that a hydraulic fluid (returned fluid) returned from the other side of the swivel motor MT is discharged to the drain fluid passage g (the hydraulic fluid tank T2). When the direction switching valve DV8 is in the second position 82, the direction switching valve DV8 switches to a direction such that a hydraulic fluid flows to the other side of the swivel motor MT, and switches to a direction such that a hydraulic fluid returned from the one side of the swivel motor MT (returned fluid) is discharged to the drain fluid passage g (the hydraulic fluid tank T2). When the direction switching valve DV8 is in the third position 83, the direction switching valve DV8 does not supply a hydraulic fluid to the swivel motor MT.

The flow-rate prioritizing valve V11B prioritizes, by moving the spool 98, the flow rate of a hydraulic fluid output to a hydraulic actuator. The spool 98 of the flow-rate prioritizing valve V11B is movable between a first position 84*a* and a second position 84*b*. The first position 84*a* is a position in which the spool 98 increases the flow rate of a hydraulic fluid output from the direction switching valve DV8. The second position 84*b* is a position in which the spool 98 reduces (decreases) the flow rate of a hydraulic fluid output from the direction switching valve DV8. That is, compared with the flow rate of a hydraulic fluid when the flow-rate prioritizing valve V11B is in an intermediate position between the first position 84*a* and the second position 84*b*, the flow rate of the hydraulic fluid when the flow-rate prioritizing valve V11B is in the first position 84*a* is high, and the flow rate of the hydraulic fluid when the flow-rate prioritizing valve V11B is in the second position 84*b* is low.

The flow-rate prioritizing valve V11B includes a pressing member 85, a first pressure receiver 86, and a second pressure receiver 87. The pressing member 85 is a member provided on the first position 84*a* side. The pressing member 85 presses the spool 98 of the flow-rate prioritizing valve V11B toward the first position 84*a*, that is, toward the open side. The pressing member 85 includes, for example, a spring. In the pressing member 85, a force for pressing the spool 98 to the first position 84*a*, that is, the set pressure (second pressure difference) of the flow-rate prioritizing valve V11B when the spool 98 is at the full stroke (at the time of the maximum area) is set lower than or equal to a first pressure difference that is the pressure difference between the PPS signal pressure and the PLS signal pressure. If the set pressure of the flow-rate prioritizing valve V11B (the set pressure due to the pressing member 85) exceeds the first pressure difference, the flow rate output from the flow-rate prioritizing valve V11B may become higher than that during a single operation.

The pressing member 85, which presses the spool 98 toward the first position 84*a*, includes the spring. Alternatively, the spool 98 may be pressed by using the pressure of a hydraulic fluid (the pressure of a pilot fluid). For example, a pressure receiver, such as a control pin, for pressing the spool 98 is provided in the flow-rate prioritizing valve V11B, and a pilot pressure is applied to the pressure receiver. The pressure applied to the pressure receiver may be a pressure of a remote-controlled valve whose pilot pressure changes in accordance with an operation member, or may be a pressure that is obtained by reducing the pressure of the remote-controlled valve by using a reducing valve.

The first pressure receiver 86 receives the pressure of a hydraulic fluid output from the direction switching valve DV8. The second pressure receiver 87 receives the pressure of a hydraulic fluid output from the first pump 21 to the swivel control valve V8. In other words, the second pressure receiver 87 receives the pressure of a hydraulic fluid on the upstream side of the spool 98 of the direction switching valve DV8. The flow-rate prioritizing valve V11B and the direction switching valve DV8 are connected by a connection fluid passage (second fluid passage) 88. The connection fluid passage (second fluid passage) 88 includes a first connection fluid passage (connection fluid passage) 88*a*, a second connection fluid passage (connection fluid passage) 88*b*, and a third connection fluid passage (connection fluid passage) 88*c*. The first connection fluid passage 88*a* connects the first delivery port (delivery port) 66 of the direction switching valve DV8 and an inlet port 89 of the flow-rate prioritizing valve V11B. The second connection fluid passage 88*b* connects the pump port 64 of the direction switching valve DV8 and the first delivery port 66 of the direction switching valve DV8. The second connection fluid passage 88*b* is formed in the direction switching valve DV8. A throttle (flow passage throttle) 90 is provided in the second connection fluid passage 88*b*. The third connection fluid passage 88*c* connects the inlet port 89 of the flow-rate prioritizing valve V11B and the first pressure receiver 86.

The pressure loss of the flow passage throttle 90 on the first position 81 side and the pressure loss due to the flow passage throttle 90 on the second position 82 side are set to the same value. The first hydraulic-fluid supply passage d and the second pressure receiver 87 of the flow-rate prioritizing valve V11B are connected by a connection fluid passage (third fluid passage) 92. To be specific, the connection fluid passage (third fluid passage) 92 connects the hydraulic-fluid branch passage f of the first hydraulic-fluid supply passage d and the second pressure receiver 87.

The flow-rate prioritizing valve V11B and the swivel motor MT are connected by a connection fluid passage 93. The connection fluid passage 93 includes a first connection fluid passage 93*a*, a second connection fluid passage 93*b*, a third connection fluid passage 93*c*, and a fourth connection fluid passage 93*d*. The first connection fluid passage 93*a* connects a delivery port 91 of the flow-rate prioritizing valve V11B and the first input port 71 of the direction switching valve DV8. The second connection fluid passage 93*b* connects the delivery port 91 of the flow-rate prioritizing valve V11B and the second input port 72 of the direction switching valve DV8. The third connection fluid passage 93*c* connects the second delivery port 73 of the direction switching valve DV8 and one-side port of the swivel motor MT. The fourth connection fluid passage 93*d* connects the third delivery port 74 of the direction switching valve DV8 and the-other-side port of the swivel motor MT. The delivery port 91 of the flow-rate prioritizing valve V11B and the load transmission line y are connected via a check valve 94.

Accordingly, the spool 98 of the flow-rate prioritizing valve V11B is pressed to the first position 84*a* by the pressure of a hydraulic fluid received by the first pressure receiver 86 (the pressure of a hydraulic fluid output from the first delivery port 66 of the direction switching valve DV8) and the pressing member 85. The spool 98 is pressed to the second position 84*b* by the pressure of a hydraulic fluid received by the second pressure receiver 87 (the pressure of a hydraulic fluid on the upstream side of the spool of the direction switching valve DV8).

With the hydraulic system described above, it is assumed that, for example, when the boom cylinder C3 and the swivel motor MT are operated in combination, the load pressure of the boom cylinder C3 when the boom cylinder C3 is actuated is 10 MPa, the load pressure of the swivel motor MT when the swivel motor MT is actuated is 3 MPa, and the set pressure of the flow rate controller 19 is 1.4 MPa. In this case, the highest load pressure of a hydraulic fluid is 10 MPa, and the pressure of a hydraulic fluid output from the first pump 21 is 11.4 MPa. Here, when it is assumed that the set pressure in the flow-rate prioritizing valve V11B is 1.0 MPa, the spool 98 of the flow-rate prioritizing valve V11B moves so that the set pressure is maintained at 1.0 MPa, and the opening area of the flow-rate prioritizing valve V11B changes. The flow rate output from the flow-rate prioritizing valve V11B is set to be constant. In other words, the pressure difference across the direction switching valve DV8 is set to 1.0 MPa (so as to generate a pressure loss of 1.0 MPa) by the flow-rate prioritizing valve V11B, and, irrespective of the load of the boom cylinder C3, it is possible to prioritize the flow of a hydraulic fluid to the swivel motor MT.

Accordingly, even with the working machine 1 including the pressure compensation valve V11, it is possible to output a hydraulic fluid with a sufficient flow rate from a predetermined control valve, and it is possible to reduce the difference in swiveling speed between a single operation and an operation in combination. Even in a single operation in which the swivel motor MT is operated singly (when other control valves are not operated), it is possible to set the flow rate output from the flow-rate prioritizing valve V11B to be constant. That is, it is possible to prioritize the flow of a hydraulic fluid from the direction switching valve DV8 toward the swivel motor MT.

However, because the spool 98 of the flow-rate prioritizing valve V11B is controlled by using the pressing member 85, for example, if the boom control valve V1 and the swivel control valve V8 are operated in combination, the spool 98 of the flow-rate prioritizing valve V11B may move slightly due to the hydraulic pressure required for actuation of the boom 15 side, and the swivel speed of the machine body 2 may slightly change. That is, because the hydraulic pressure required for actuation of the boom cylinder C3 is high and the hydraulic pressure required for actuation of the swivel motor MT is low, by the amount of the pressure difference, the control position of the flow-rate prioritizing valve V11B may slightly differ between a time when a swivel operation is performed singly and a time when (swiveling of) the machine body 2 and the boom 15 are operated in combination, and thus the swivel speed changes.

In order to suppress this, a dummy load is formed in the direction switching valve DV8 that switches the direction of a hydraulic fluid for the swivel motor MT. To be specific, as illustrated in FIG. 14, a dummy-load forming unit 97, which forms a dummy load in the direction switching valve DV8 (the swivel control valve V8) of the other embodiment, is provided in a flow passage 96 through which a hydraulic fluid flows toward the swivel motor MT. The flow passage 96 includes a first flow passage 96*a*, which is a flow passage through which a hydraulic fluid flows to the one side of the swivel motor MT when the direction switching valve DV8 is in the first position 81, and a second flow passage 96*b*, which is a flow passage through which a hydraulic fluid flows to the other side of the swivel motor MT when the direction switching valve DV8 is in the second position 82. The dummy-load forming unit 97 includes throttles 97*a* and 97*b* that are respectively provided in the first flow passage 96*a* and the second flow passage 96*b*. That is, the dummy-load forming unit 97 includes a first throttle 97*a* provided in the first flow passage 96*a* and a second throttle 97*b* provided in the second flow passage 96*b*. The pressure loss due to the first throttle 97*a* and the pressure loss due to the second throttle 97*b* are the same. The pressure loss due to the first throttle 97*a* and the pressure loss due to the second throttle 97*b* are greater than the pressure loss due to the throttle 90.

With the swivel control valve V8 configured as described above, by generating a dummy load in the direction switching valve DV8 of the swivel control valve V8 by using the first throttle 97*a* and the second throttle 97*b* and increasing the hydraulic pressure required for actuation of the swivel motor MT from the beginning, it is possible to balance the working pressure when the boom cylinder C3, whose load is high, and the swivel motor MT, whose load is low, are operated in combination. To be specific, if it is assumed that the load pressure when the swivel motor MT is actuated is 3 MPa and the pressure loss due to the first throttle 97*a* and the pressure loss due to the second throttle 97*b* are each 3 MPa, the load pressure (the hydraulic pressure required for actuation of the swivel motor MT) is 6 MPa. Then, by adjusting the swivel speed in accordance with the load pressure, the pressure difference during an operation in combination decreases. Thus, the amount of change in the control area of the flow-rate prioritizing valve V11B decreases (the dummy load generated by the flow-rate prioritizing valve V11B decreases), and it is possible to suppress a variation in the swivel speed of the machine body 2 between a time when a swivel operation is performed singly and a time when the machine body 2 (swiveling) and the boom 15 are operated in combination. Moreover, it is possible to stabilize the control position of the flow-rate prioritizing valve V11B during an operation in combination.

In the embodiment described above, the boom cylinder C3 is an example of a high-load hydraulic actuator, and the swivel motor MT is an example of a low-load hydraulic actuator. However, this is not a limitation.

The working machine 1 includes: the plurality of hydraulic actuators C3 and MT including a high-load hydraulic actuator C3 and a low-load hydraulic actuator MT, a hydraulic pressure required for actuation of the low-load hydraulic actuator MT being lower than a hydraulic pressure required for actuation of the high-load hydraulic actuator C3; the plurality of direction switching valves DV2 and DV8 that are provided so as to correspond to the plurality of hydraulic actuators C3 and MT, respectively, and each of which switches a direction of hydraulic fluid for a corresponding one of the hydraulic actuators C3 and MT, the plurality of direction switching valves DV2 and DV8 including a low-load direction switching valve DV8 that switches a direction of hydraulic fluid for the low-load hydraulic actuator MT; and the dummy-load forming unit 97 that forms a dummy load in the low-load direction switching valve DV8 to suppress a variation in an actuation speed of the low-load hydraulic actuator MT between a time when the high-load hydraulic actuator C3 and the low-load hydraulic actuator MT are operated in combination and a time when the low-load hydraulic actuator MT is operated singly.

With this configuration, by generating a dummy load in the low-load direction switching valve DV8 beforehand by using the dummy-load forming unit 97 and increasing the hydraulic pressure required for actuation of the low-load hydraulic actuator MT, it is possible to reduce the pressure difference when the high-load hydraulic actuator C3 and the low-load hydraulic actuator MT are operated in combination. Thus, it is possible to suppress a variation in the actuation speed of the low-load hydraulic actuator MT between a time when the high-load hydraulic actuator C3 and the low-load hydraulic actuator MT are operated in combination and a time when the low-load hydraulic actuator MT is operated singly.

The low-load direction switching valve DV8 has the flow passage 96 through which a hydraulic fluid flows toward the low-load hydraulic actuator MT, and the dummy-load forming unit 97 includes the throttles 97*a* and 97*b* that are provided in the flow passage 96.

With this configuration, it is possible to provide the dummy-load forming unit 97 in the low-load direction switching valve DV8.

The working machine 1 includes: the first control valve V2 that controls the high-load hydraulic actuator C3 and that includes the pressure compensation valve V11A that sets the pressure difference between the pressure of a hydraulic fluid that is introduced thereinto and the pressure of a hydraulic fluid output therefrom to be constant; and the second control valve V8 that controls the low-load hydraulic actuator MT and that includes the low-load direction switching valve DV8 and the flow-rate prioritizing valve V11B that prioritizes the flow rate of a hydraulic fluid output to the low-load hydraulic actuator MT via the low-load direction switching valve DV8.

With this configuration, it is possible to prioritize supply of a hydraulic fluid to the low-load hydraulic actuator MT even when the high-load hydraulic actuator C3 includes the pressure compensation valve V11A.

The flow-rate prioritizing valve V11B includes: the spool 98 that is movable between the first position 84*a* in which the spool 98 increases the flow rate of a hydraulic fluid output from the low-load direction switching valve DV8, and the second position 84*b* in which the spool 98 reduces the flow rate of the hydraulic fluid output from the low-load direction switching valve DV8; and the pressing member 85 that presses the spool 98 toward the first position 84*a*. The low-load direction switching valve DV8 includes the first flow passage 96*a* that is the flow passage 96 through which a hydraulic fluid flows to one side of the low-load hydraulic actuator MT, and the second flow passage 96*b* that is the flow passage 96 through which a hydraulic fluid flows to the other side of the low-load hydraulic actuator MT. The dummy-load forming unit 97 includes the first throttle 97*a* that is the throttle provided in the first flow passage 96*a* and the second throttle 97*b* that is the throttle provided in the second flow passage 96*b*.

With this configuration, when the high-load hydraulic actuator C3 and the low-load hydraulic actuator MT are operated in combination, it is possible to prevent the flow rate of a hydraulic fluid output from the flow-rate prioritizing valve V11B from varying due to the setting of the pressing member 85, it is possible to stabilize the control position of the flow-rate prioritizing valve V11B, and it is possible to suppress a variation in the speed of the low-load hydraulic actuator MT.

The low-load direction switching valve DV8 includes the pump port 64 to which a hydraulic fluid is supplied, the delivery port 66 from which a hydraulic fluid is output to the flow-rate prioritizing valve V11B, the connection fluid passage 88*b* that connects the pump port 64 and the delivery port 66, and the flow passage throttle 90 that is provided in the connection fluid passage 88*b*. A pressure loss due to the first throttle 97*a* and a pressure loss due to the second throttle 97*b* are larger than a pressure loss due to the flow passage throttle 90.

With this configuration, it is possible to form a dummy load in the low-load direction switching valve DV8.

The working machine 1 includes the machine body 2 that is capable of swiveling around a vertical axis, the swivel motor MT that swivels the machine body 2, the boom 15 that is provided on a front part of the machine body 2 so as to be swingable upward and downward, and the boom cylinder C3 that swings the boom 15 upward and downward. The high-load hydraulic actuator includes the boom cylinder C3. The low-load hydraulic actuator includes the swivel motor MT.

With this configuration, it is possible to suppress a variation in the actuation speed of the swivel motor MT between a time when the boom cylinder C3 and the swivel motor MT are operated in combination and a time when the swivel motor MT is operated singly.

The working machine 1 may include: the variable displacement pump 21 that delivers a hydraulic fluid for actuating the plurality of hydraulic actuators ML, MR, MT, and C1 to C6; and the load sensing system that controls the pump 21 so that the pressure difference between the delivery pressure of the pump 21 and the highest load pressure of the plurality of hydraulic actuators ML, MR, MT, and C1 to C6 is a constant pressure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:

a plurality of hydraulic actuators including a high-load hydraulic actuator and a low-load hydraulic actuator, a hydraulic pressure required for actuation of the low-load hydraulic actuator being lower than a hydraulic pressure required for actuation of the high-load hydraulic actuator;

a plurality of direction switching valves that are provided so as to correspond to the plurality of hydraulic actuators, respectively, and each of which switches a direction of hydraulic fluid for a corresponding one of the hydraulic actuators, the plurality of direction switching valves including a low-load direction switching valve that switches a direction of hydraulic fluid for the low-load hydraulic actuator; and a plurality of dummy-load forming units that each forms a dummy load in the low-load direction switching valve to suppress a variation in an actuation speed of the low-load hydraulic actuator between a time when the high-load hydraulic actuator and the low-load hydraulic actuator are operated in combination and a time when the low-load hydraulic actuator is operated singly, wherein the low-load direction switching valve includes a first flow passage through which a hydraulic fluid flows to a one-side port of the low-load hydraulic actuator, and a second flow passage through which a hydraulic fluid flows to an other-side port of the low-load hydraulic actuator, a high-load direction switching valve that is one of the direction switching valves and switches a direction of hydraulic fluid for the high-load hydraulic actuator, includes a first fluid passage through which a hydraulic fluid flows to a one-side port of the high-load hydraulic actuator, and a second fluid passage which is different from the first fluid passage and through which a hydraulic fluid flows to an other-side-port of the high-load hydraulic actuator, one of the plurality of dummy-load forming units includes a first throttle that is provided in the first flow passage and another one of the plurality of dummy-load forming units includes a second throttle that is provided in the second flow passage, and the first fluid passage and the second fluid passage are not provided with a throttle.

2. The working machine according to claim 1, comprising:

a first control valve that controls the high-load hydraulic actuator and that includes a pressure compensation valve that sets a pressure difference between a pressure of a hydraulic fluid that is introduced thereinto and a pressure of a hydraulic fluid output therefrom to be constant; and a second control valve that controls the low-load hydraulic actuator and that includes the low-load direction switching valve and a flow-rate prioritizing valve that prioritizes a flow rate of a hydraulic fluid output to the low-load hydraulic actuator via the low-load direction switching valve.

3. The working machine according to claim 1, comprising:

a machine body that is capable of swiveling around a vertical axis;

a swivel motor that swivels the machine body;

a boom that is provided on a front part of the machine body so as to be swingable upward and downward; and a boom cylinder that swings the boom upward and downward, wherein the high-load hydraulic actuator includes the boom cylinder, and wherein the low-load hydraulic actuator includes the swivel motor.

4. The working machine according to claim 1, comprising:

a variable displacement pump that delivers a hydraulic fluid for actuating the plurality of hydraulic actuators; and a load sensing system that controls the pump so that a pressure difference between a delivery pressure of the pump and a highest load pressure of the plurality of hydraulic actuators is a constant pressure.

5. A working machine comprising:

a plurality of hydraulic actuators including a high-load hydraulic actuator and a low-load hydraulic actuator, a hydraulic pressure required for actuation of the low-load hydraulic actuator being lower than a hydraulic pressure required for actuation of the high-load hydraulic actuator;

a plurality of direction switching valves that are provided so as to correspond to the plurality of hydraulic actuators, respectively, and each of which switches a direction of hydraulic fluid for a corresponding one of the hydraulic actuators, the plurality of direction switching valves including a low-load direction switching valve that switches a direction of hydraulic fluid for the low-load hydraulic actuator;

a dummy-load forming unit that forms a dummy load in the low-load direction switching valve to suppress a variation in an actuation speed of the low-load hydraulic actuator between a time when the high-load hydraulic actuator and the low-load hydraulic actuator are operated in combination and a time when the low-load hydraulic actuator is operated singly;

a first control valve that controls the high-load hydraulic actuator and that includes a pressure compensation valve that sets a pressure difference between a pressure of a hydraulic fluid that is introduced thereinto and a pressure of a hydraulic fluid output therefrom to be constant; and a second control valve that controls the low-load hydraulic actuator and that includes the low-load direction switching valve and a flow-rate prioritizing valve that prioritizes a flow rate of a hydraulic fluid output to the low-load hydraulic actuator via the low-load direction switching valve, wherein the low-load direction switching valve has a flow passage through which a hydraulic fluid flows toward the low-load hydraulic actuator, wherein the dummy-load forming unit includes a throttle that is provided in the flow passage, wherein the flow-rate prioritizing valve includes a spool that is movable between a first position in which the spool increases a flow rate of a hydraulic fluid output from the low-load direction switching valve and a second position in which the spool reduces the flow rate of the hydraulic fluid output from the low-load direction switching valve, and a pressing member that presses the spool toward the first position, wherein the low-load direction switching valve includes a first flow passage that is the flow passage through which a hydraulic fluid flows to one side of the low-load hydraulic actuator, and a second flow passage that is the flow passage through which a hydraulic fluid flows to the other side of the low-load hydraulic actuator, and wherein the dummy-load forming unit includes a first throttle that is the throttle provided in the first flow passage and a second throttle that is the throttle provided in the second flow passage.

6. The working machine according to claim 5, wherein the low-load direction switching valve includes a pump port to which a hydraulic fluid is supplied, a delivery port from which a hydraulic fluid is output to the flow-rate prioritizing valve, a connection fluid passage that connects the pump port and the delivery port, and a flow passage throttle that is provided in the connection fluid passage, and wherein a pressure loss due to the first throttle and a pressure loss due to the second throttle are larger than a pressure loss due to the flow passage throttle.

* * * * *